US012574811B2

(12) United States Patent
Rao et al.

(10) Patent No.: US 12,574,811 B2
(45) Date of Patent: Mar. 10, 2026

(54) METHODS AND APPARATUS FOR SUPPORTING POSITIONING SERVICE CONTINUITY

(71) Applicant: InterDigital Patent Holdings, Inc., Wilmington, DE (US)

(72) Inventors: Jaya Rao, Montreal (CA); Fumihiro Hasegawa, Westmount (CA); Tuong Hoang, Montreal (CA); Aata El Hamss, Laval (CA); Moon Il Lee, Melville, NY (US); Ghyslain Pelletier, Montréal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 264 days.

(21) Appl. No.: 18/284,613

(22) PCT Filed: Mar. 28, 2022

(86) PCT No.: PCT/US2022/022171
§ 371 (c)(1),
(2) Date: Sep. 28, 2023

(87) PCT Pub. No.: WO2022/212272
PCT Pub. Date: Oct. 6, 2022

(65) Prior Publication Data
US 2024/0179583 A1     May 30, 2024

Related U.S. Application Data

(60) Provisional application No. 63/257,213, filed on Oct. 19, 2021, provisional application No. 63/249,199,
(Continued)

(51) Int. Cl.
| | | |
|---|---|---|
| *H04W 36/00* | (2009.01) | |
| *H04L 5/00* | (2006.01) | |
| *H04W 64/00* | (2009.01) | |

(52) U.S. Cl.
CPC ....... *H04W 36/0058* (2018.08); *H04L 5/0048* (2013.01); *H04W 64/00* (2013.01)

(58) Field of Classification Search
CPC ................................................ H04W 36/0058
See application file for complete search history.

(56) References Cited

U.S. PATENT DOCUMENTS

| | | | | |
|---|---|---|---|---|
| 9,338,591 | B1 * | 5/2016 | Vivanco | ............ H04W 36/0088 |
| 2013/0064219 | A1 | 3/2013 | Siomina et al. | |

(Continued)

FOREIGN PATENT DOCUMENTS

| | | | |
|---|---|---|---|
| JP | 2016054518 A | 4/2016 | |
| WO | WO-2018203819 A1 * | 11/2018 | ............ H04W 24/10 |

OTHER PUBLICATIONS

Huawei, et al., "Discussion on the broadcasting of assistance data", 3GPP Tdoc R1-1805504, 3GPP TSG-RAN WG2 Meeting #101bis, Sanya, China, Apr. 16-20, 2018, 3 pages.

(Continued)

*Primary Examiner* — Jason E Mattis
(74) *Attorney, Agent, or Firm* — Majid Albassam

(57) ABSTRACT

The disclosure pertains to methods and apparatus for supporting positioning service continuity. One representative method includes receiving, by a wireless transmit/receive unit (WTRU), a configuration for supporting positioning service continuity during a handover. The method additionally includes supporting, by the WTRU, positioning service continuity according to the configuration at least in part by determining one or more transmissions to be performed. The method also includes assisting a radio access network with (Continued)

700

710
RECEIVE INFORMATION INDICATING: (1) A FIRST POSITIONING REFERENCE SIGNAL (PRS) CONFIGURATION ASSOCIATED WITH A FIRST CELL, (2) A SECOND PRS CONFIGURATION ASSOCIATED WITH A SECOND CELL, AND (3) A MEASUREMENT GAP (MG) CONFIGURATION

720
PERFORM FIRST PRS MEASUREMENTS ON A FIRST TRANSMISSION FROM THE FIRST CELL USING THE FIRST PRS CONFIGURATION AND THE MG CONFIGURATION

730
SEND, TO A FIRST NETWORK ENTITY (NE) ASSOCIATED WITH THE FIRST CELL, A REQUEST INCLUDING INFORMATION INDICATING TO MAINTAIN, AFTER A MOBILITY EVENT (ME) ASSOCIATED WITH THE SECOND CELL IS PERFORMED, THE MG CONFIGURATION

740
RECEIVE INFORMATION INDICATING: (1) TO PERFORM THE ME ASSOCIATED WITH THE SECOND CELL, AND (2) TO MAINTAIN, AFTER THE ME IS PERFORMED, THE MG CONFIGURATION

750
PERFORM, AFTER THE ME IS PERFORMED, SECOND PRS MEASUREMENTS ON THE FIRST TRANSMISSION OR A FURTHER TRANSMISSION FROM THE FIRST CELL USING THE FIRST PRS CONFIGURATION AND THE MG CONFIGURATION

760
SEND, TO A SECOND NE ASSOCIATED WITH THE FIRST CELL, INFORMATION INDICATING THE SECOND PRS MEASUREMENTS a data link handover by performing the one or more transmissions according to the configuration.

40 Claims, 13 Drawing Sheets

Related U.S. Application Data filed on Sep. 28, 2021, provisional application No. 63/168,195, filed on Mar. 30, 2021.

(56)                    References Cited

U.S. PATENT DOCUMENTS

| | | | | |
|---|---|---|---|---|
| 2013/0267246 A1* | 10/2013 | Wang | H04W 24/00 | |
| | | | | 455/456.1 |
| 2015/0139053 A1* | 5/2015 | Van Lieshout | H04W 52/0229 | |
| | | | | 370/311 |
| 2020/0137601 A1* | 4/2020 | Siomina | H04W 4/70 | |
| 2020/0137715 A1* | 4/2020 | Edge | G01S 5/06 | |
| 2020/0266942 A1 | 8/2020 | Akkarakaran et al. | | |
| 2021/0120513 A1* | 4/2021 | Siomina | H04W 64/00 | |
| 2023/0283424 A1* | 9/2023 | Rao | H04L 5/0053 | |
| | | | | 370/329 |
| 2023/0362699 A1* | 11/2023 | Yerramalli | H04W 24/10 | |
| 2023/0362872 A1* | 11/2023 | Hu | H04L 5/0048 | |
| 2024/0015686 A1* | 1/2024 | Rao | H04W 64/00 | |

OTHER PUBLICATIONS

3rd Generation Partnership Project (3GPP), "Technical Specification Group Radio Access Network; NR; Radio Resource Control (RRC) protocol specification (Release 16)", 3GPP TS 38.331 V16.1.0, Jul. 2020, 818 pages.

3rd Generation Partnership Project (3GPP), "Technical Specification Group Radio Access Network; NG Radio Access Network(NG-RAN); Stage 2 functional specification of User Equipment (UE) positioning in NG-RAN (Release 16)", 3GPP TS 38.305 V16.1.0, Jul. 2020, 114 pages.

"Handling preconfigured gaps for POS upon a handover, [S854][S855][S856]", 3GPP Tdoc R2-2205048, 3GPP TSG RAN WG2 Meeting #118-e Electronic, May 9-May 20, 2022, 7 pages.

"Discussion on PRS RSTD accuracy requirements", 3GPP Tdoc R4-2101787, 3GPP TSG RAN WG4 Meeting #98-e Electronic Meeting, Jan. 25-Feb. 5, 2020, 4 pages.

\* cited by examiner

DL-PRS

Data Link Connection

204

206

202

208

200

WTRU receives DL-PRS from target gNB/base station while connected to source gNB/base station Data Link
Connection

304

306

DL-PRS

300

WTRU receives DL-PRS from
source gNB/base station while
connected to target gNB/base
station

302

308

WTRU receives DL-PRS from
source gNB/base station and
target gNB/base station
during HO

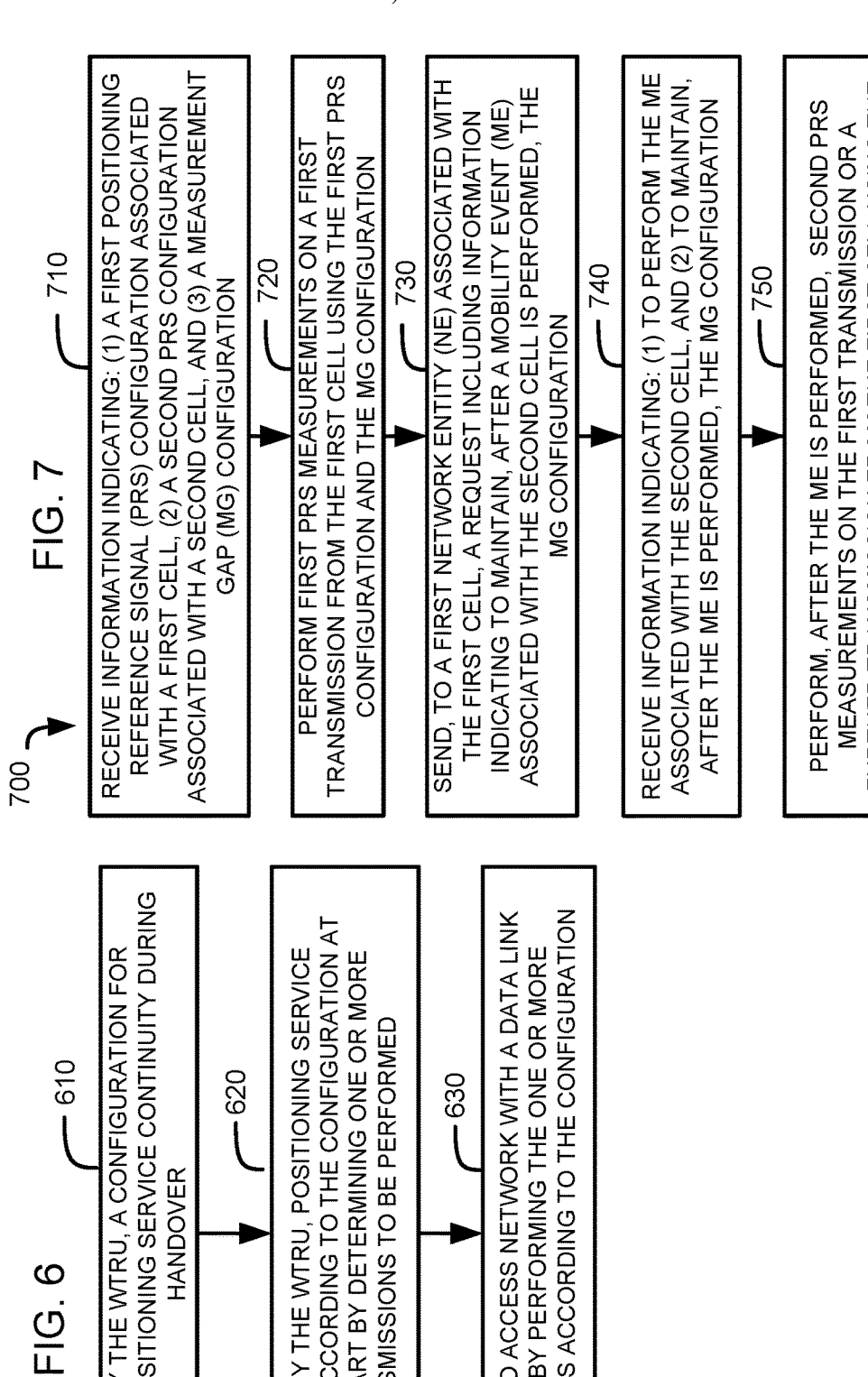

710   RECEIVE INFORMATION INDICATING: (1) A FIRST POSITIONING REFERENCE SIGNAL (PRS) CONFIGURATION ASSOCIATED WITH A FIRST CELL, (2) A SECOND PRS CONFIGURATION ASSOCIATED WITH A SECOND CELL, AND (3) A MEASUREMENT GAP (MG) CONFIGURATION

720   PERFORM FIRST PRS MEASUREMENTS ON A FIRST TRANSMISSION FROM THE FIRST CELL USING THE FIRST PRS CONFIGURATION AND THE MG CONFIGURATION

730   SEND, TO A FIRST NETWORK ENTITY (NE) ASSOCIATED WITH THE FIRST CELL, A REQUEST INCLUDING INFORMATION INDICATING TO MAINTAIN, AFTER A MOBILITY EVENT (ME) ASSOCIATED WITH THE SECOND CELL IS PERFORMED, THE MG CONFIGURATION

740   RECEIVE INFORMATION INDICATING: (1) TO PERFORM THE ME ASSOCIATED WITH THE SECOND CELL, AND (2) TO MAINTAIN, AFTER THE ME IS PERFORMED, THE MG CONFIGURATION

750   PERFORM, AFTER THE ME IS PERFORMED, SECOND PRS MEASUREMENTS ON THE FIRST TRANSMISSION OR A FURTHER TRANSMISSION FROM THE FIRST CELL USING THE FIRST PRS CONFIGURATION AND THE MG CONFIGURATION

760   SEND, TO A SECOND NE ASSOCIATED WITH THE FIRST CELL, INFORMATION INDICATING THE SECOND PRS MEASUREMENTS

610   RECEIVE, BY THE WTRU, A CONFIGURATION FOR SUPPORTING POSITIONING SERVICE CONTINUITY DURING HANDOVER

620   SUPPORT, BY THE WTRU, POSITIONING SERVICE CONTINUITY ACCORDING TO THE CONFIGURATION AT LEAST IN PART BY DETERMINING ONE OR MORE TRANSMISSIONS TO BE PERFORMED

630   ASSIST A RADIO ACCESS NETWORK WITH A DATA LINK HANDOVER BY PERFORMING THE ONE OR MORE TRANSMISSIONS ACCORDING TO THE CONFIGURATION

910 — RECEIVE INFORMATION INDICATING: (1) A POSITIONING REFERENCE SIGNAL (PRS) CONFIGURATION ASSOCIATED WITH A FIRST CELL AND (2) A MEASUREMENT GAP (MG) CONFIGURATION

920 — RECEIVE INFORMATION INDICATING A MOBILITY EVENT (ME) ASSOCIATED WITH A SECOND CELL IS TO BE PERFORMED

930 — PERFORM FIRST PRS MEASUREMENTS ON ONE OR MORE TRANSMISSIONS FROM THE FIRST CELL USING THE PRS CONFIGURATION AND THE MG CONFIGURATION, WHEREIN THE PERFORMING OF THE PRS MEASUREMENTS OCCURS BEFORE AND AFTER THE INDICATED ME IS PERFORMED

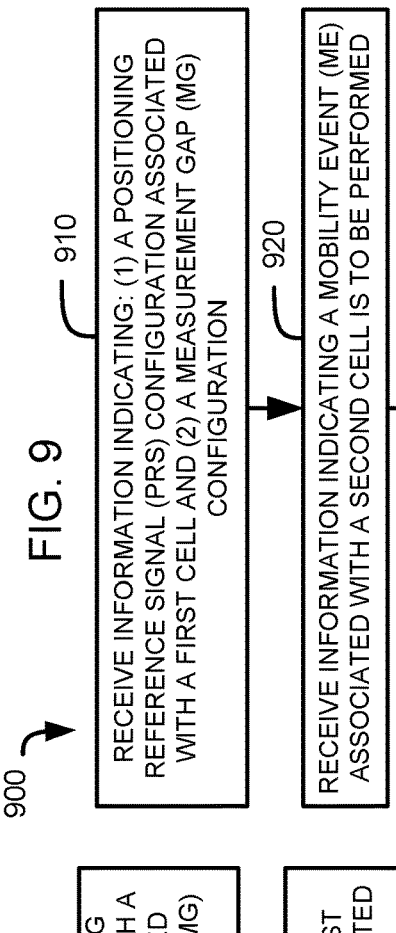

810 — RECEIVE INFORMATION INDICATING: (1) A FIRST POSITIONING REFERENCE SIGNAL (PRS) CONFIGURATION ASSOCIATED WITH A FIRST CELL, (2) A SECOND PRS CONFIGURATION ASSOCIATED WITH A SECOND CELL, AND (3) A FIRST MEASUREMENT GAP (MG) CONFIGURATION ASSOCIATED WITH THE FIRST CELL

820 — PERFORM, BEFORE A HANDOVER (HO), FIRST PRS MEASUREMENTS ON A FIRST TRANSMISSION FROM THE FIRST CELL USING THE FIRST PRS CONFIGURATION AND THE INDICATED FIRST MG CONFIGURATION

830 — ON CONDITION THAT THE HO OCCURRED, DETERMINE WHETHER TO USE THE INDICATED FIRST MG CONFIGURATION OR A FURTHER MG CONFIGURATION ASSOCIATED WITH THE SECOND CELL

840 — ON CONDITION THAT THE FURTHER MG CONFIGURATION IS TO BE USED, SEND, TO A FIRST NETWORK ENTITY (NE) ASSOCIATED WITH THE SECOND CELL, A REQUEST FOR THE FURTHER MG CONFIGURATION

850 — RECEIVE, INFORMATION INDICATING THE FURTHER MG CONFIGURATION

860 — PERFORM, AFTER THE HO, SECOND PRS MEASUREMENTS ON A TRANSMISSION FROM THE SECOND CELL USING THE SECOND PRS CONFIGURATION AND THE FURTHER MG CONFIGURATION

870 — SEND, TO A SECOND NE ASSOCIATED WITH THE SECOND CELL, INFORMATION INDICATING ANY OF: (1) THE SECOND PRS MEASUREMENTS, (2) THE SECOND PRS CONFIGURATION, AND/OR (3) A TIME WHEN THE WTRU STARTED TO USE THE SECOND PRS CONFIGURATION

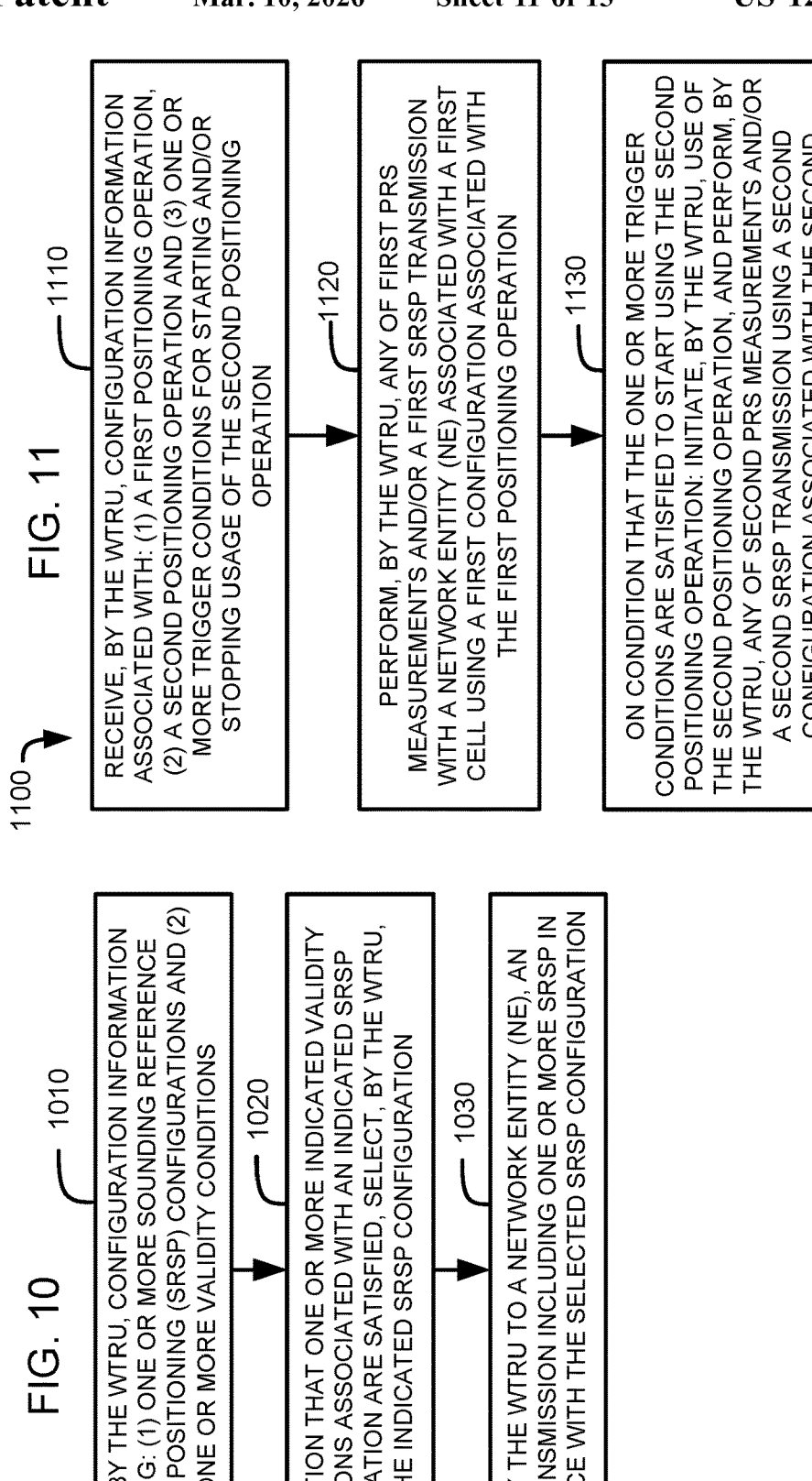

RECEIVE, BY THE WTRU, CONFIGURATION INFORMATION ASSOCIATED WITH: (1) A FIRST POSITIONING OPERATION, (2) A SECOND POSITIONING OPERATION AND (3) ONE OR MORE TRIGGER CONDITIONS FOR STARTING AND/OR STOPPING USAGE OF THE SECOND POSITIONING OPERATION

1120

PERFORM, BY THE WTRU, ANY OF FIRST PRS MEASUREMENTS AND/OR A FIRST SRSP TRANSMISSION WITH A NETWORK ENTITY (NE) ASSOCIATED WITH A FIRST CELL USING A FIRST CONFIGURATION ASSOCIATED WITH THE FIRST POSITIONING OPERATION

1130

ON CONDITION THAT THE ONE OR MORE TRIGGER CONDITIONS ARE SATISFIED TO START USING THE SECOND POSITIONING OPERATION: INITIATE, BY THE WTRU, USE OF THE SECOND POSITIONING OPERATION, AND PERFORM, BY THE WTRU, ANY OF SECOND PRS MEASUREMENTS AND/OR A SECOND SRSP TRANSMISSION USING A SECOND CONFIGURATION ASSOCIATED WITH THE SECOND POSITIONING OPERATION

RECEIVE, BY THE WTRU, CONFIGURATION INFORMATION INDICATING: (1) ONE OR MORE SOUNDING REFERENCE SIGNAL FOR POSITIONING (SRSP) CONFIGURATIONS AND (2) ONE OR MORE VALIDITY CONDITIONS

1020

ON CONDITION THAT ONE OR MORE INDICATED VALIDITY CONDITIONS ASSOCIATED WITH AN INDICATED SRSP CONFIGURATION ARE SATISFIED, SELECT, BY THE WTRU, THE INDICATED SRSP CONFIGURATION

1030

SEND, BY THE WTRU TO A NETWORK ENTITY (NE), AN UPLINK TRANSMISSION INCLUDING ONE OR MORE SRSP IN ACCORDANCE WITH THE SELECTED SRSP CONFIGURATION

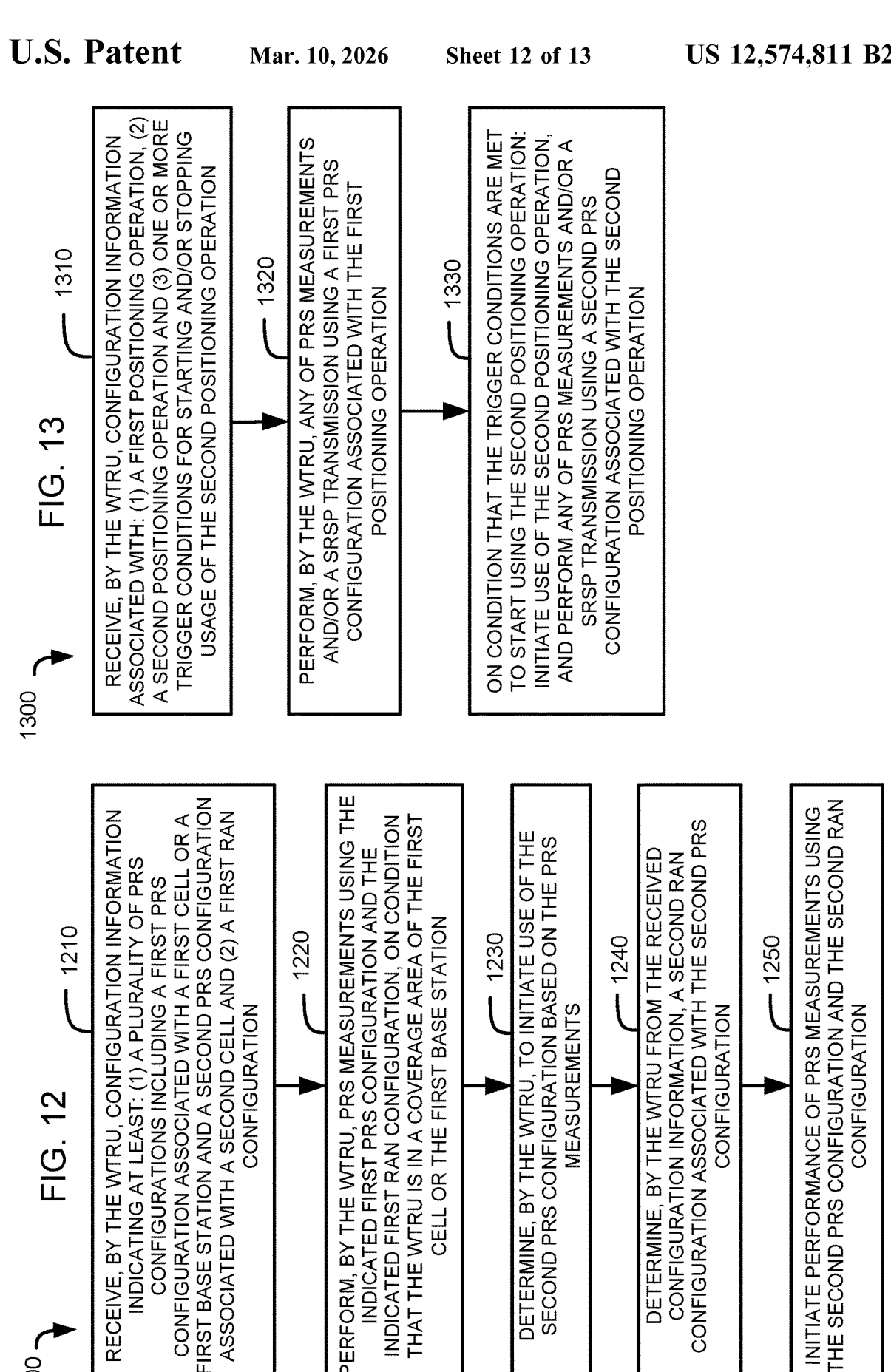

1310 RECEIVE, BY THE WTRU, CONFIGURATION INFORMATION ASSOCIATED WITH: (1) A FIRST POSITIONING OPERATION, (2) A SECOND POSITIONING OPERATION AND (3) ONE OR MORE TRIGGER CONDITIONS FOR STARTING AND/OR STOPPING USAGE OF THE SECOND POSITIONING OPERATION

1320 PERFORM, BY THE WTRU, ANY OF PRS MEASUREMENTS AND/OR A SRSP TRANSMISSION USING A FIRST PRS CONFIGURATION ASSOCIATED WITH THE FIRST POSITIONING OPERATION

1330 ON CONDITION THAT THE TRIGGER CONDITIONS ARE MET TO START USING THE SECOND POSITIONING OPERATION: INITIATE USE OF THE SECOND POSITIONING OPERATION, AND PERFORM ANY OF PRS MEASUREMENTS AND/OR A SRSP TRANSMISSION USING A SECOND PRS CONFIGURATION ASSOCIATED WITH THE SECOND POSITIONING OPERATION

1210 RECEIVE, BY THE WTRU, CONFIGURATION INFORMATION INDICATING AT LEAST: (1) A PLURALITY OF PRS CONFIGURATIONS INCLUDING A FIRST PRS CONFIGURATION ASSOCIATED WITH A FIRST CELL OR A FIRST BASE STATION AND A SECOND PRS CONFIGURATION ASSOCIATED WITH A SECOND CELL AND (2) A FIRST RAN CONFIGURATION

1220 PERFORM, BY THE WTRU, PRS MEASUREMENTS USING THE INDICATED FIRST PRS CONFIGURATION AND THE INDICATED FIRST RAN CONFIGURATION, ON CONDITION THAT THE WTRU IS IN A COVERAGE AREA OF THE FIRST CELL OR THE FIRST BASE STATION

1230 DETERMINE, BY THE WTRU, TO INITIATE USE OF THE SECOND PRS CONFIGURATION BASED ON THE PRS MEASUREMENTS

1240 DETERMINE, BY THE WTRU FROM THE RECEIVED CONFIGURATION INFORMATION, A SECOND RAN CONFIGURATION ASSOCIATED WITH THE SECOND PRS CONFIGURATION

1250 INITIATE PERFORMANCE OF PRS MEASUREMENTS USING THE SECOND PRS CONFIGURATION AND THE SECOND RAN CONFIGURATION

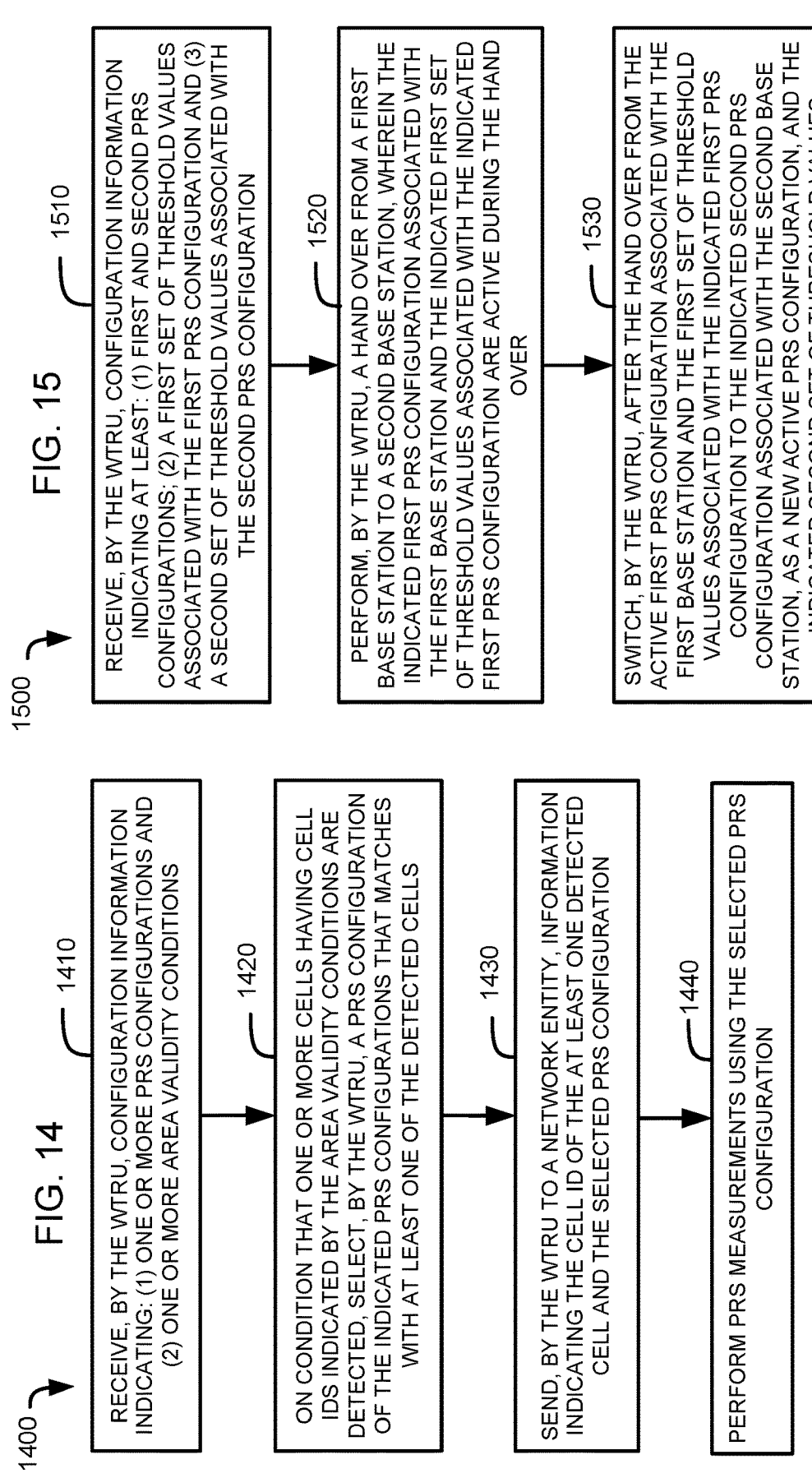

1510 — RECEIVE, BY THE WTRU, CONFIGURATION INFORMATION INDICATING AT LEAST: (1) FIRST AND SECOND PRS CONFIGURATIONS; (2) A FIRST SET OF THRESHOLD VALUES ASSOCIATED WITH THE FIRST PRS CONFIGURATION AND (3) A SECOND SET OF THRESHOLD VALUES ASSOCIATED WITH THE SECOND PRS CONFIGURATION

1520 — PERFORM, BY THE WTRU, A HAND OVER FROM A FIRST BASE STATION TO A SECOND BASE STATION, WHEREIN THE INDICATED FIRST PRS CONFIGURATION ASSOCIATED WITH THE FIRST BASE STATION AND THE INDICATED FIRST SET OF THRESHOLD VALUES ASSOCIATED WITH THE INDICATED FIRST PRS CONFIGURATION ARE ACTIVE DURING THE HAND OVER

1530 — SWITCH, BY THE WTRU, AFTER THE HAND OVER FROM THE ACTIVE FIRST PRS CONFIGURATION ASSOCIATED WITH THE FIRST BASE STATION AND THE FIRST SET OF THRESHOLD VALUES ASSOCIATED WITH THE INDICATED FIRST PRS CONFIGURATION TO THE INDICATED SECOND PRS CONFIGURATION ASSOCIATED WITH THE SECOND BASE STATION, AS A NEW ACTIVE PRS CONFIGURATION, AND THE INDICATED SECOND SET OF THRESHOLD VALUES ASSOCIATED WITH THE INDICATED SECOND PRS CONFIGURATION

1410 — RECEIVE, BY THE WTRU, CONFIGURATION INFORMATION INDICATING: (1) ONE OR MORE PRS CONFIGURATIONS AND (2) ONE OR MORE AREA VALIDITY CONDITIONS

1420 — ON CONDITION THAT ONE OR MORE CELLS HAVING CELL IDS INDICATED BY THE AREA VALIDITY CONDITIONS ARE DETECTED, SELECT, BY THE WTRU, A PRS CONFIGURATION OF THE INDICATED PRS CONFIGURATIONS THAT MATCHES WITH AT LEAST ONE OF THE DETECTED CELLS

1430 — SEND, BY THE WTRU TO A NETWORK ENTITY, INFORMATION INDICATING THE CELL ID OF THE AT LEAST ONE DETECTED CELL AND THE SELECTED PRS CONFIGURATION

1440 — PERFORM PRS MEASUREMENTS USING THE SELECTED PRS CONFIGURATION

METHODS AND APPARATUS FOR SUPPORTING POSITIONING SERVICE CONTINUITY

CROSS REFERENCE TO RELATED APPLICATIONS

This application is a U.S. National Stage Application under 35 U.S.C. 371 of International Patent Application No. PCT/US2022/022171, filed Mar. 28, 2022, which claims the benefit of U.S. Provisional Application No. 63/257,213, filed Oct. 19, 2021, U.S. Provisional Application No. 63/249,199, filed Sep. 28, 2021, and U.S. Provisional Application No. 63/168,195, filed Mar. 30, 2021, which are incorporated herein by reference in their entirety.

FIELD OF THE INVENTION

This disclosure pertains to methods and apparatus for performing wireless communications and pertains in particular to supporting positioning service continuity.

RELATED ART

In 3GPP, Rel. 16, SRS resource set and SRS resources configured for positioning are specified.

SUMMARY

In certain representative embodiments, methods, apparatus, and systems may be implemented to support positioning service continuity for downlink (DL)-based positioning.

In certain representative embodiments, methods, apparatus, and systems may be implemented to support positioning service continuity for uplink (UL)-based positioning.

In certain representative embodiments, methods, apparatus, and systems may be implemented to support positioning service continuity based on switching between different positioning methods.

In certain representative embodiments, methods, apparatus, and systems may be implemented in which a WTRU switches from a first PRS configuration to a second PRS configuration after a handover (HO) based on configured PRS configurations associated with different base stations/ gNBs/cells and threshold values.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGs.") indicate like elements, and wherein.

Figure 1A:
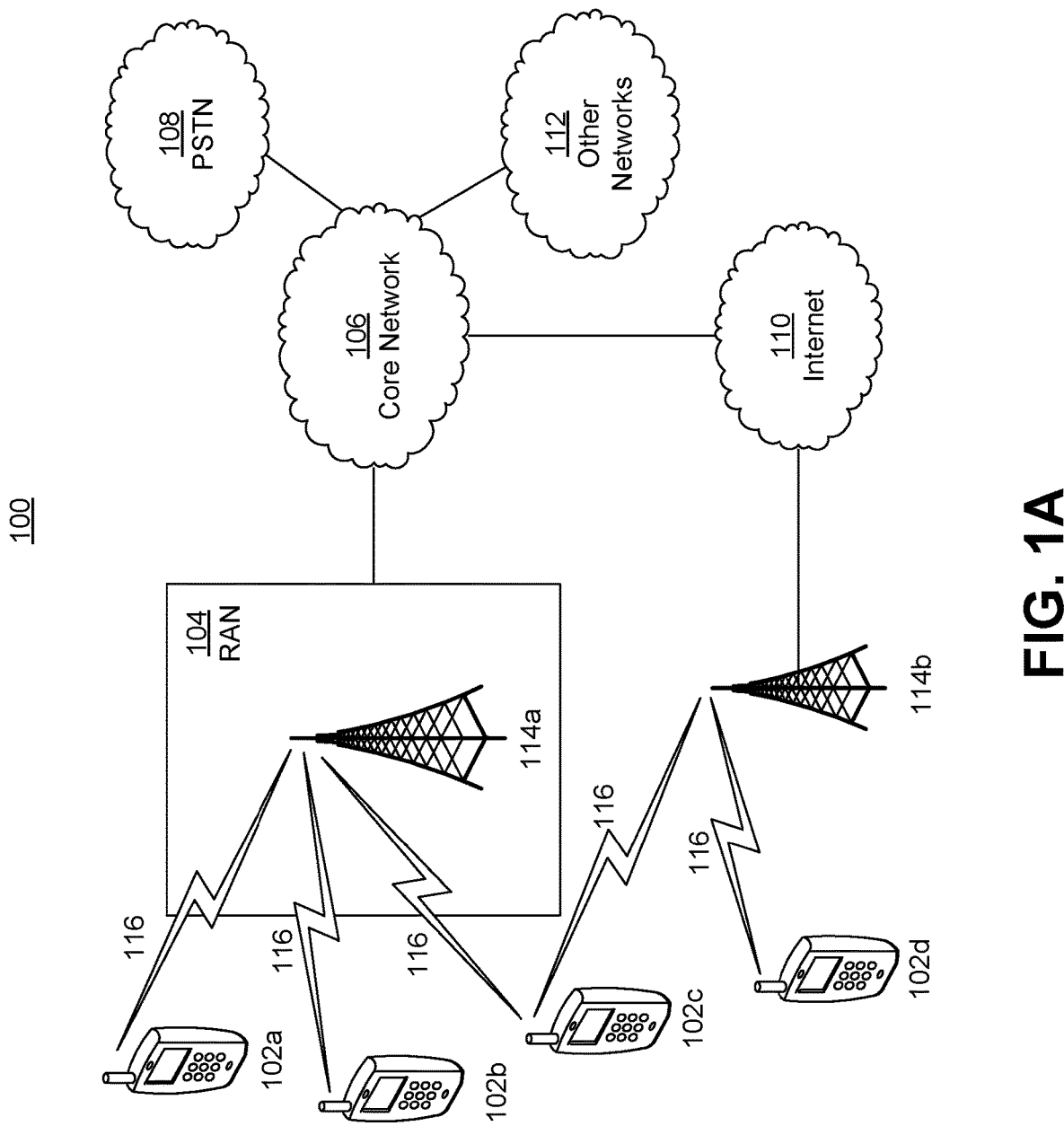
FIG. 1A is a system diagram illustrating an example communications system in which one or more disclosed embodiments may be implemented.
Figure 1B:
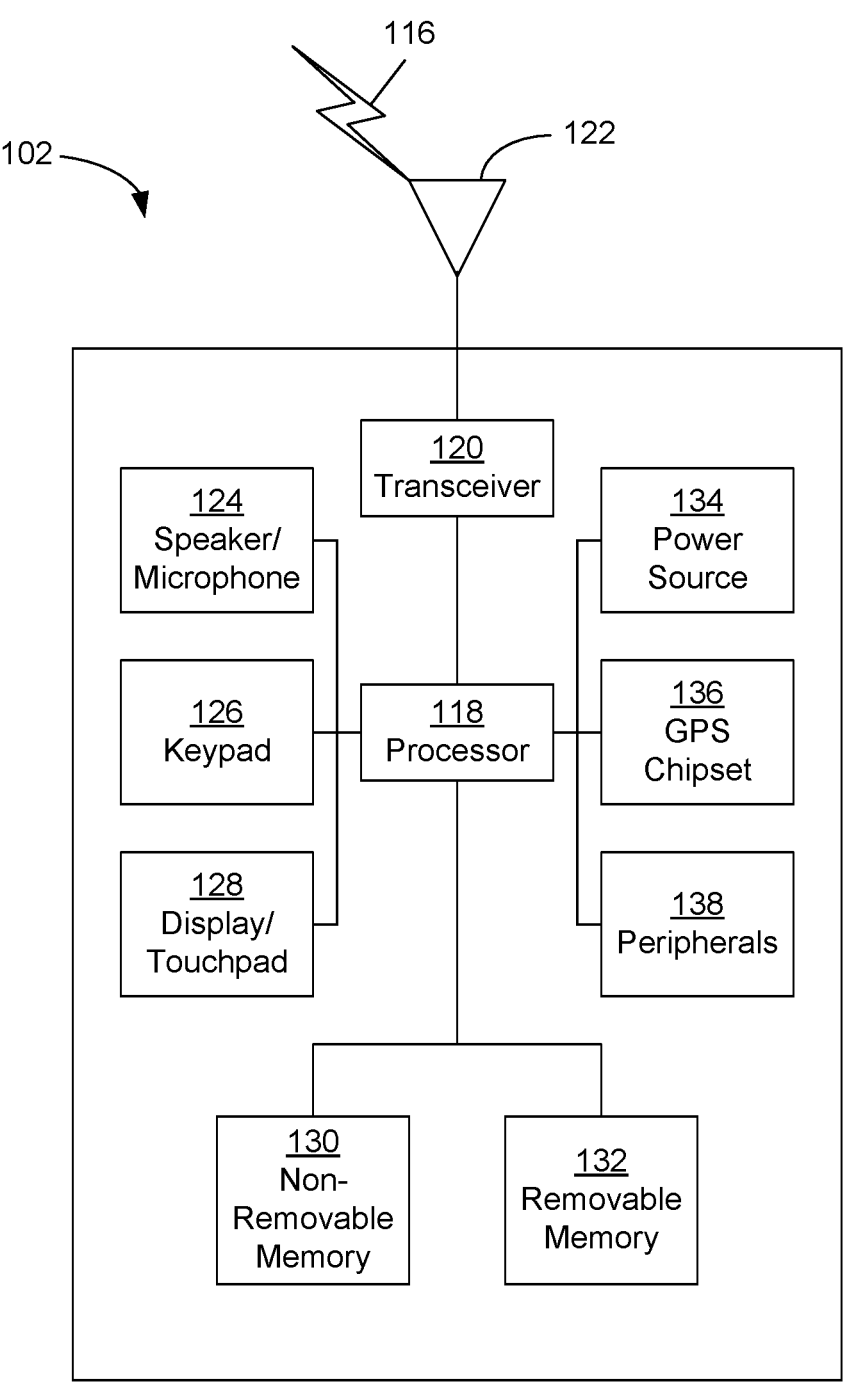
FIG. 1B is a system diagram illustrating an example wireless transmit/receive unit (WTRU) that may be used within the communications system illustrated in FIG. 1A according to one or more embodiments.
Figure 1C:
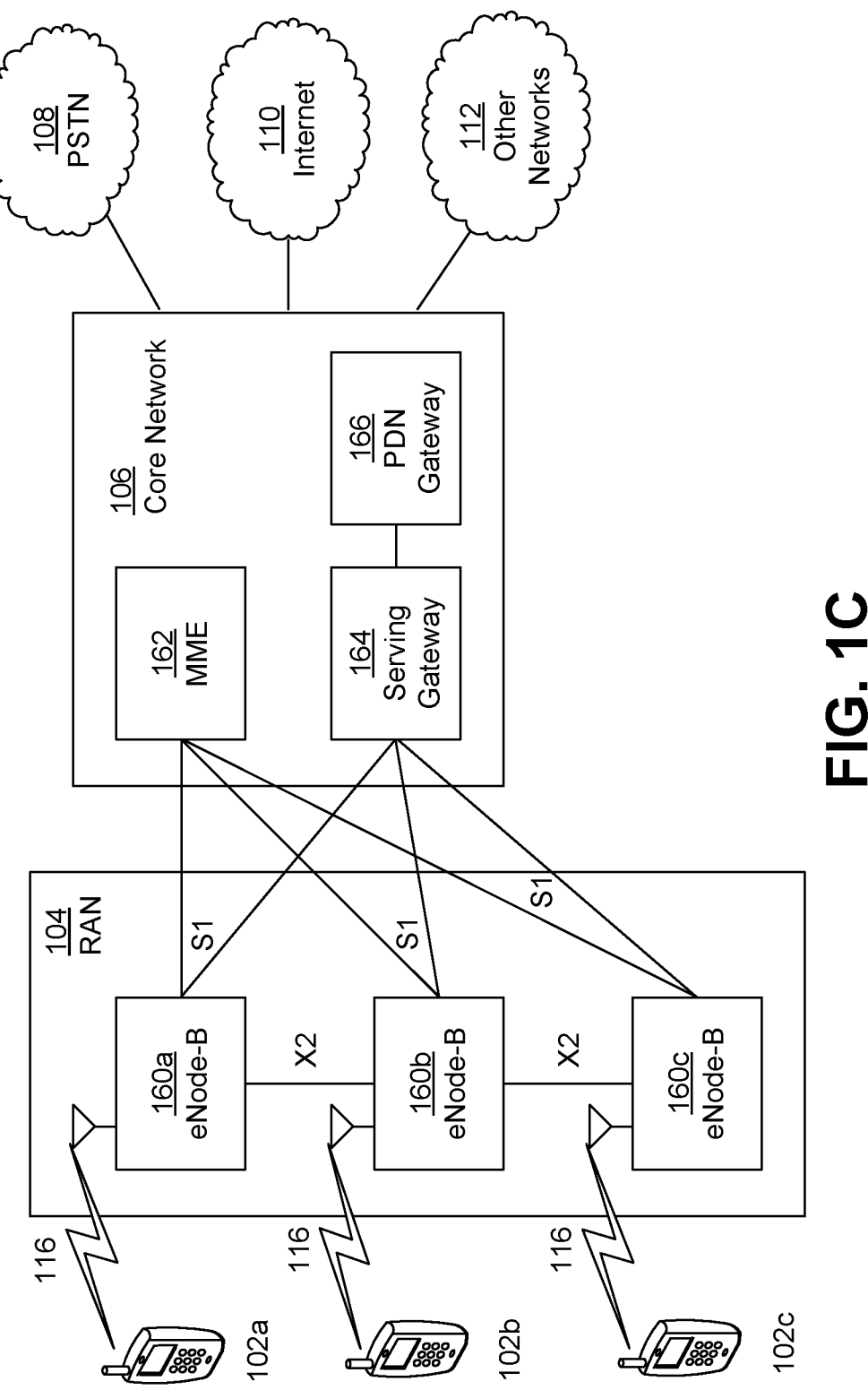
FIG. 1C is a system diagram illustrating an example radio access network (RAN) and an example core network (CN)
Figure 1D:
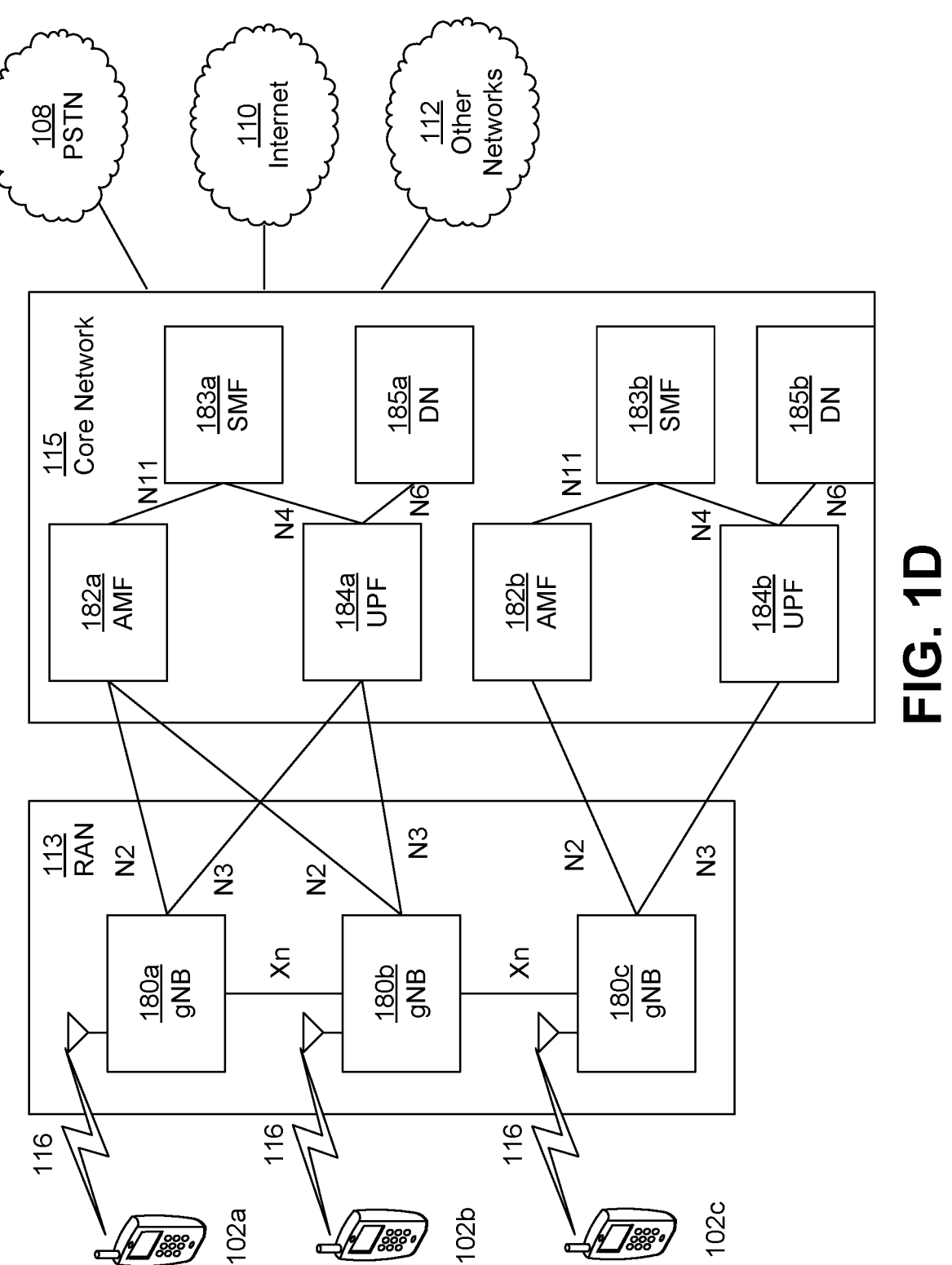
Figure 2:
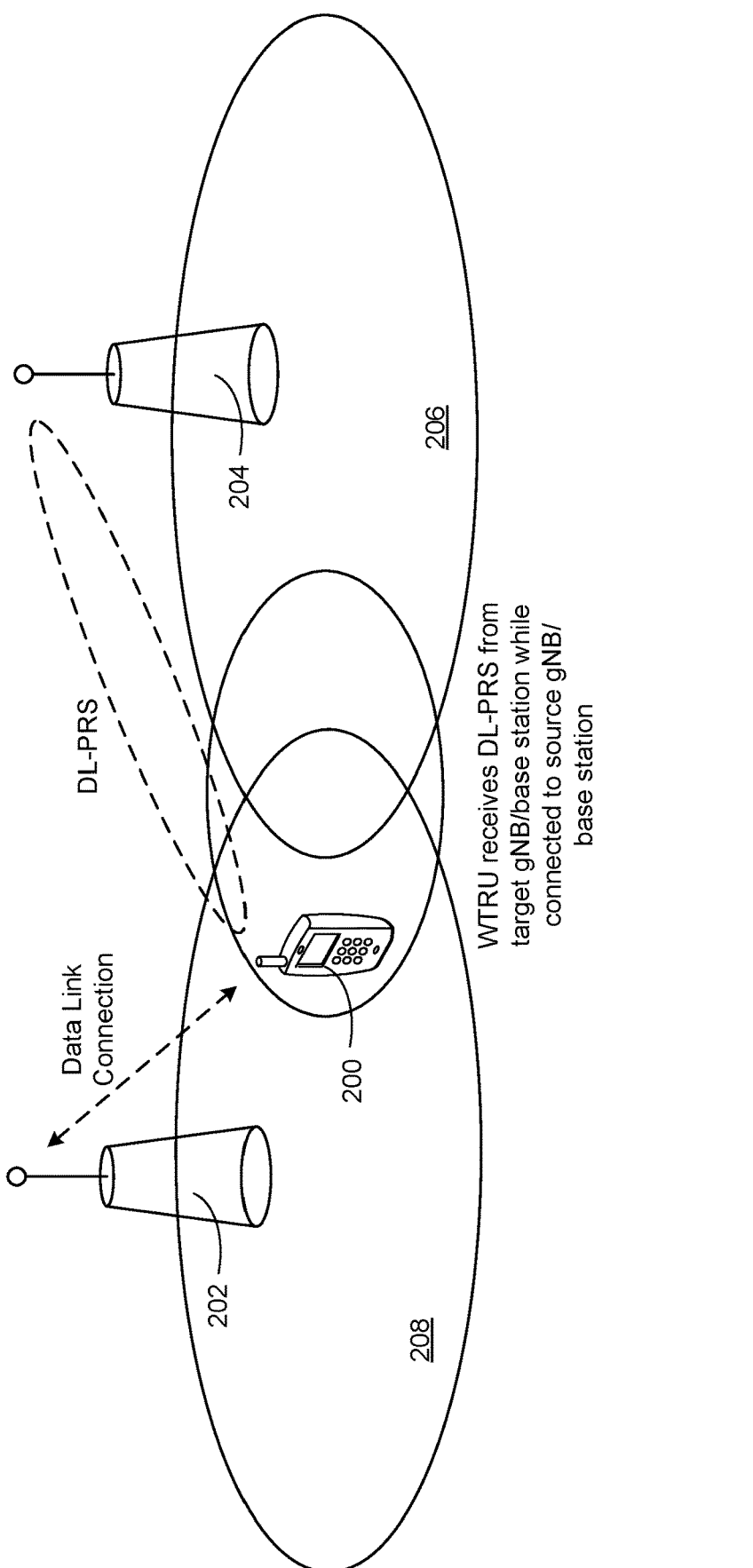
Figure 3:
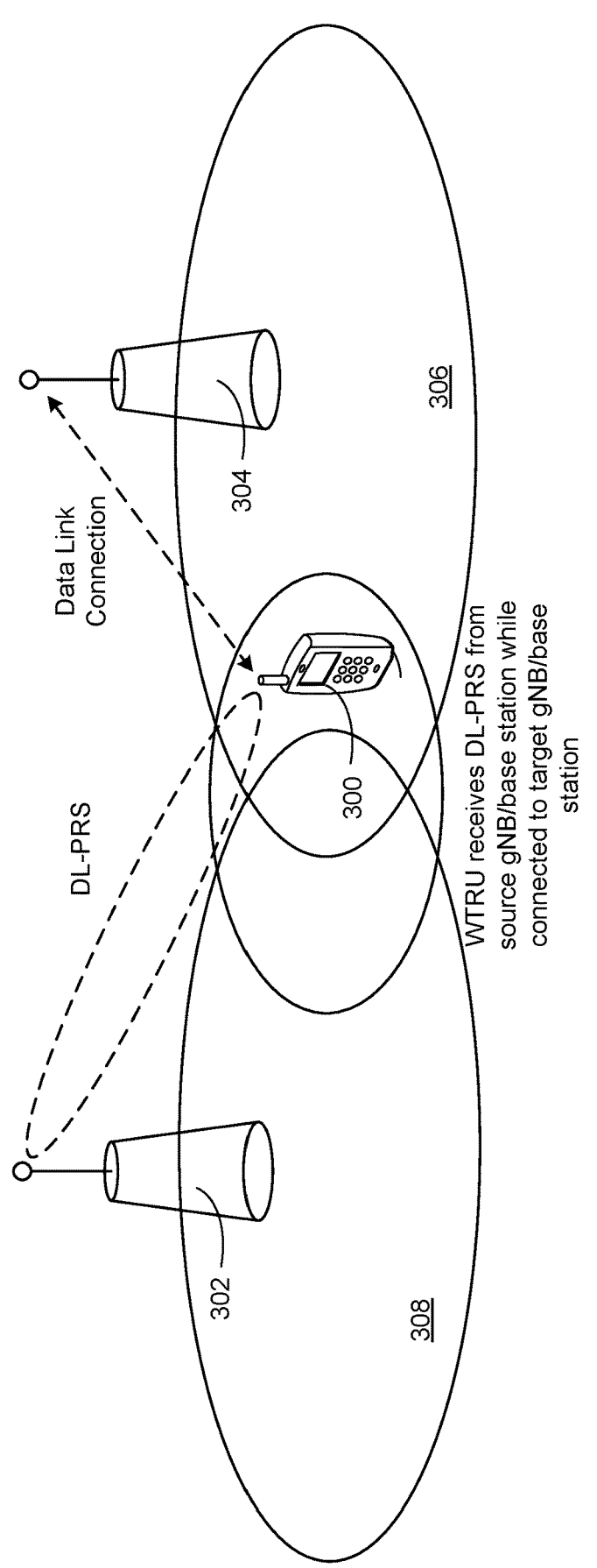
Figure 4:
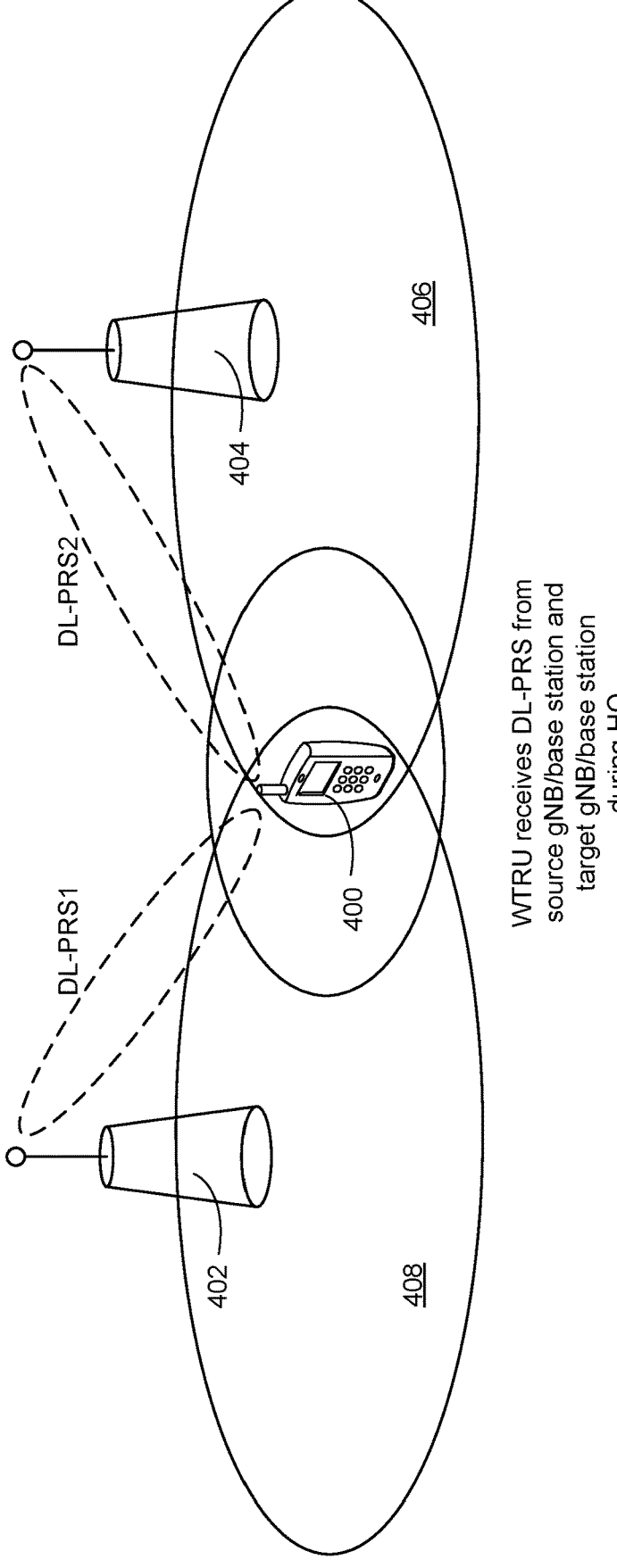
Figure 5:
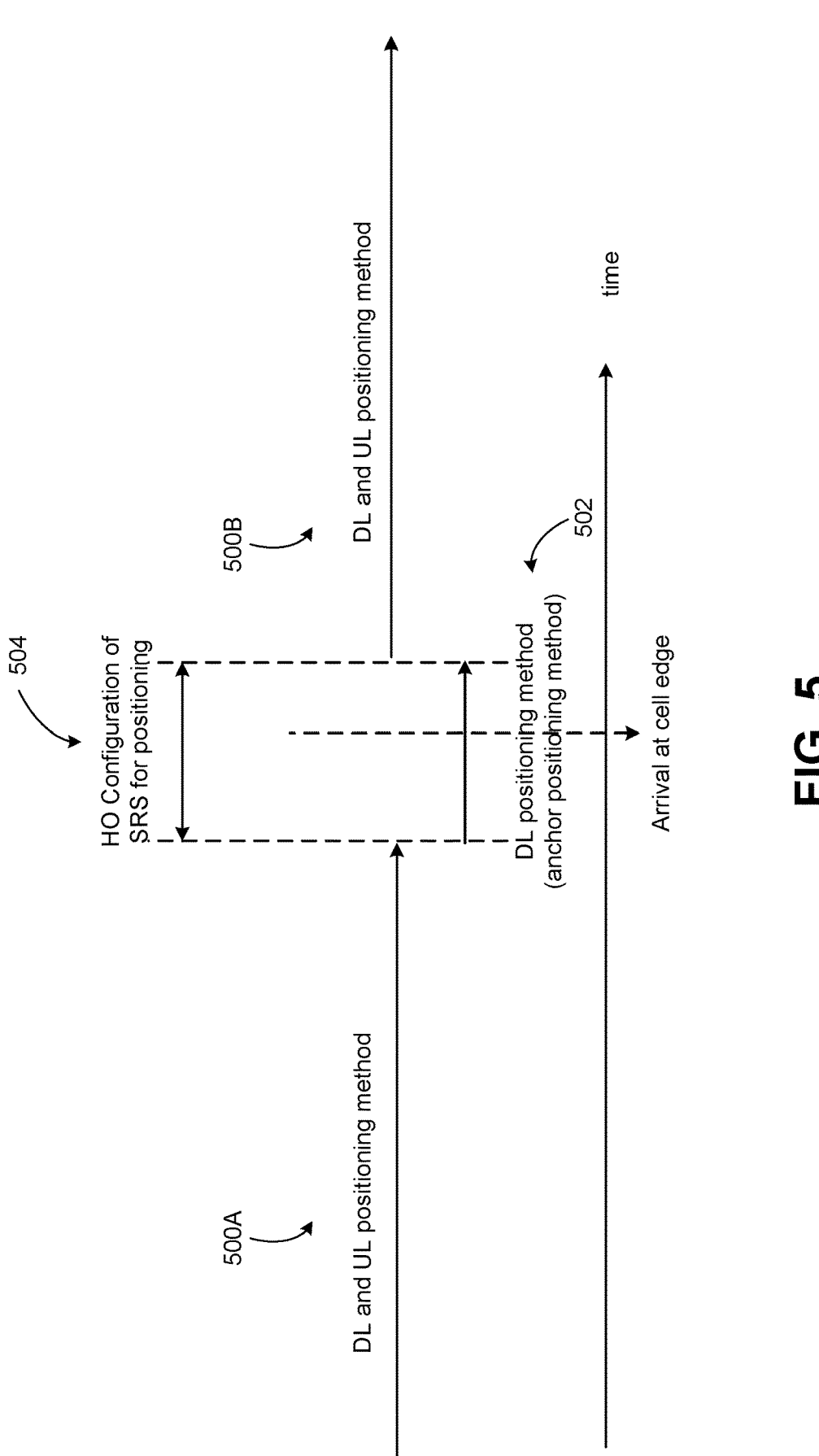

that may be used within the communications system illustrated in FIG. 1A according to one or more embodiments;

FIG. 1D is a system diagram illustrating a further example RAN and a further example CN that may be used within the communications system illustrated in FIG. 1A according to one or more embodiments;

FIG. 2 is a system diagram illustrating a WTRU receiving downlink (DL)-positioning reference signal (PRS) from a target gNB while connected to a source gNB according to one or more embodiments;

FIG. 3 is a system diagram illustrating a WTRU receiving DL-PRS from a source gNB while connected to a target gNB according to one or more embodiments;

FIG. 4 is a system diagram illustrating a WTRU receiving a DL-PRS from a source gNB and target gNB during handover (HO) according to one or more embodiments;

FIG. 5 is a graphical illustration depicting timing of operations before, during, and after HO according to one or more embodiments.

FIG. 6 is a flow diagram illustrating a representative method implemented by a WTRU according to one or more embodiments;

FIG. 7 is a flow diagram illustrating another representative method implemented by a WTRU according to one or more embodiments;

FIG. 8 is a flow diagram illustrating a further representative method implemented by a WTRU according to one or more embodiments;

FIG. 9 is a flow diagram illustrating an additional representative method implemented by a WTRU according to one or more embodiments;

FIG. 10 is a flow diagram illustrating still another representative method implemented by a WTRU according to one or more embodiments;

FIG. 11 is a flow diagram illustrating a still further representative method implemented by a WTRU according to one or more embodiments;

FIG. 12 is a flow diagram illustrating a still additional representative method implemented by a WTRU according to one or more embodiments;

FIG. 13 is a flow diagram illustrating yet another representative method implemented by a WTRU according to one or more embodiments;

FIG. 14 is a flow diagram illustrating a yet further representative method implemented by a WTRU according to one or more embodiments; and FIG. 15 is a flow diagram illustrating a yet additional representative method implemented by a WTRU according to one or more embodiments.

DETAILED DESCRIPTION

Introduction

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

Example Networks for Implementation of Embodiments

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word direct fourier transform (DFT)-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc.

The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c.

The SGW 164 may perform other functions, such as anchoring user planes during inter-eNode B HOs, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, HO decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of nonaccess stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182A, 182B may provide a control plane function for switching between the RAN 113 and other RANs (not shown) that employ other radio technologies, such as LTE, LTE-A, LTE-A Pro, and/or non-3$^{rd}$ Generation Partnership Project (3GPP) access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Supporting Positioning Service Continuity

Positioning Service in Legacy Systems

In Rel. 16, DL, UL and DL and UL positioning methods are used. In the DL positioning methods, PRS are sent from multiple TX/RX points (TRPs) to the WTRU. The WTRU will observe multiple reference signals and measure time difference of arrival between a pair of PRSs. Then, the WTRU returns a measured reference signal time difference (RSTD) to the location management function (LMF). In addition, the WTRU can return measured reference signal receive power (RSRP) for each PRS. Based on the returned measurements, the LMF conducts positioning of the WTRU. Alternatively, the WTRU can report RSRP for DL angle-based positioning methods.

An LMF is a non-limiting example of a node or entity (e.g., network node or entity) that may be used for or to support positioning. Any other node or entity may be substituted for the LMF and still be consistent with this disclosure. In the UL positioning methods, the WTRU sends a sounding reference signal (SRS) for positioning, configured by radio resource control (RRC), to reception points (RPs). For timing-based methods, the RP measures relative time of arrival (RTOA) for received SRS and reports measured values to the LMF. The WTRU can report RSRP for SRS. In the angle-based UL positioning methods, the RP measures angles of arrival and reports to the LMF.

Finally, in the UL and DL positioning methods, the WTRU measures Rx-Tx time difference between a received PRS and a transmitted SRS. The Rx-Tx time difference is reported to the LMF from the WTRU. The WTRU can also report measured RSRP for PRS. Similarly, at the TRP, Rx-Tx difference between received SRS and transmitted PRS is computed.

In this disclosure, various positioning methods are considered/implemented. For example, a "DL positioning method" may refer to any positioning method that uses DL reference signals such as PRS. The WTRU receives multiple reference signals from transmission points (TP) and measures DL RSTD and/or RSRP. Examples of DL positioning methods are DL-Angle of Departure (AoD) or DL-time difference of arrival (TDOA) positioning. Additionally, a "UL positioning method" may refer to any positioning method that uses UL reference signals such as SRS for positioning. The WTRU transmits SRS to multiple RPs and the RPs measure the UL RTOA and/or RSRP. Examples of UL positioning methods are UL-TDOA or UL-AoA positioning. Also, a "DL & UL positioning method" may refer to any positioning method that uses both UL and DL reference signals for positioning. In one example, a WTRU transmits SRS to multiple TRPs and a gNB measures Rx-Tx time difference. The gNB can measure RSRP for the received SRS. The WTRU measures Rx-Tx time difference for PRS transmitted from multiple TRPs. The WTRU can measure RSRP for the received PRS. The Rx-TX difference and possibly RSRP measured at the WTRU and the gNB are used to compute round trip time. Here Rx and Tx difference refers to the difference between arrival time of the reference signal transmitted by the TRP and transmission time of the reference signal transmitted from the WTRU. An example of a DL & UL positioning method is multi-round trip time (RTT) positioning.

In this disclosure, "Network" may include one or more AMFs, one or more LMFs and/or one or more next generation radio access networks (NG-RANs). Rel-16/17 positioning procedures for DL-PRS measurements in an RRC CONNECTED state allow a limited level of intra-gNB mobility (within coverage areas of TRPs belonging to the same gNB) and inter-gNB mobility (for scenarios where the same PRS configuration is used by multiple gNBs). The reporting of measurements or location information to the LMF is supported via the serving gNB/cell. Positioning service continuity for UL-based positioning, where the WTRU can continue using the same Sounding Reference Signal for Positioning (SRSp) configuration, during/after HO is not supported in Rel-16/17.

3GPP Rel-17 supports WTRU-based and LMF-based positioning for RAT-dependent positioning. The WTRU behavior and the procedures for supporting positioning service continuity with low latency and high accuracy for RAT-dependent positioning are unknown.

For DL-based positioning, where the WTRU determines positioning information based on measurements of DL-PRS, when the WTRU undergoes data link HO from a source gNB to a target gNB, the WTRU needs to request or may request for a new PRS configuration when the PRS configurations used by the source and target gNBs are different. Sending a request to the LMF via the target gNB and receiving the new PRS configuration upon performing data link HO may result in increased latency and possible positioning gaps (e.g., positioning measurements may be unavailable). Additionally, the inability to perform measurements on the PRS received from the target gNB, from which the WTRU may receive the strongest PRS compared to other gNBs, until the new PRS configuration is available at WTRU, may also cause loss in positioning accuracy at the WTRU. Moreover, even when the target gNB uses the same PRS configuration as that of the source gNB, the measurement gap configured by the source gNB via RRC signaling may be released during data link HO and reconfigured by the target gNB after HO. This may also cause possible positioning gap and higher latency associated with measurement gap configuration.

For UL-based positioning, the time/frequency resource configuration for UL-SRSp are configured in the WTRU by the serving gNB. When the WTRU undergoes data link HO, the SRSp configuration provided by the source gNB may be released. Subsequently, the latency for receiving a new SRSp configuration from the target gNB after the HO may be high. In this case, positioning gaps and loss in positioning accuracy may occur due to inability for the TRPs associated with the target gNB to make measurements on the new SRSp sent by WTRU.

For DL&UL based positioning (e.g., multi-RTT positioning method), the set of TRPs that can transmit/receive the PRS/SRSp may change based on WTRU mobility. This may also result in incorrect estimation of WTRU-to-TRP distances, possible incorrect positioning calculations and loss in positioning accuracy.

In general, the existing (Rel-16/17) approaches for supporting RAT-dependent positioning can result in high latency and positioning gaps (durations where positioning measurements are unavailable) due to a delay in LMF/RAN triggering the PRS/SRSp transmission from the target cell and/or WTRU. In this regard, the one problem to address is or may be how to ensure positioning service continuity such that the QoS associated with positioning (e.g., high accuracy, low latency, low signaling overhead) can be supported during WTRU mobility.

Representative Positioning Solutions/Procedures

Regarding reference signals in this disclosure, it should be noted that "SRS for positioning" refers herein to an SRS signal/transmission used for positioning. Resources for SRS for positioning (SRSp) may be defined (e.g., signalled) by RRC. In Rel. 16, SRS resource set and SRS resource configured for positioning are specified. However, "SRS for positioning" or "SRS" in certain embodiments may include various types of signals. For example, the SRS can be an SRS which is configured under SRS-PosResourceSet-r16 and SRS-PosResource-r16. Alternatively or additionally, the SRS can be an SRS which is configured under SRS-ResourceSet and SRS-Resource. Alternatively or additionally, the SRS can be an SRS which is not configured under SRS-PosResourceSet-r16 and SRS-PosResource-r16. Alternatively or additionally, the SRS can be an SRS which is not configured under SRS-ResourceSet and SRS-Resource. Alternatively or additionally, the SRS can be an SRS which is not associated with SRS-PosResourceSet-r16, SRS-PosResource-r16, SRS-ResourceSet or SRS-Resource. Alternatively or additionally, the SRS can be an UL reference signal that is associated for positioning. Alternatively or additionally, the SRS can be a demodulation reference signal (DM-RS) for UL. Alternatively or additionally, the SRS can be a phase tracking reference signal (PTRS) for UL.

For brevity, SRS for positioning is denoted as "SRSp". Also, PRS or SRS used in this disclosure are not limited to RS used for positioning. The disclosed methods can be applied to or used with any DL or UL reference signals.

Regarding positioning configurations in this disclosure, a positioning configuration may include a set of information related to positioning measurement and/or SRSp transmission. Various types of information may be included in a positioning configuration. For example, a positioning configuration may include information regarding positioning method used (e.g., DL-TDOA, UL-TDOA, DL-AoD, UL-AoA, Multi-RTT). Additionally or alternatively, a positioning configuration may include information regarding PRS configuration, SRSp configuration, and/or UL resource (e.g., physical random access channel (PRACH), physical UL shared channel (PUSCH), and/or physical uplink control channel (PUCCH)) to report the positioning measurement. Additionally or alternatively, a positioning configuration may include information regarding one or more threshold values to determine the positioning measurement quality and/or a positioning mode of operation (e.g., starting positioning mode of operation).

Regarding PRS resource configuration, this type of configuration may include various types of information. For example, the PRS configuration may include information regarding PRS resource ID, PRS sequence ID, and/or other IDs used to generate a PRS sequence. Alternatively or additionally, the PRS configuration may include information regarding a PRS resource element offset, a PRS resource slot offset, and/or a PRS symbol offset. Alternatively or additionally, the PRS configuration may include information regarding PRS quasi co-location (QCL) information, a PRS resource set ID, and/or a list of PRS resources in the resource set. Alternatively or additionally, the PRS configuration may include information regarding a number of PRS symbols, a muting pattern for PRS, muting parameters such as repetition factor, and/or muting options. Alternatively or additionally, the PRS configuration may include information regarding PRS resource power, periodicity of PRS transmission, spatial direction information of PRS transmission (e.g., beam information, angles of transmission), and/or spatial direction information of UL RS reception (e.g., beam ID used to receive UL RS, angle of arrival (AoA)).

Regarding SRSp resources configuration, this type of configuration may include various types of information. For example, the SRSp resources configuration may include information regarding a resource ID, comb offset values, cyclic shift values, and/or start position in the frequency domain. Alternatively or additionally, the SRSp resources configuration may include information regarding a number of SRSp symbols, a shift in the frequency domain for SRSp, a frequency hopping pattern, and/or a type of SRSp, e.g., aperiodic, semi-persistent or periodic. Alternatively or additionally, the SRSp resources configuration may include information regarding a sequence ID used to generate SRSp, or other IDs used to generate a SRSp sequence. Alternatively or additionally, the SRSp resources configuration may include spatial relation information indicating which reference signal the SRSp is related to spatially. Alternatively or additionally, the SRSp resources configuration may include a resource set ID, a list of SRSp resources in the resource set, and/or transmission power related information. Alternatively or additionally, the SRSp resources configuration may include pathloss reference information which may contain an index for synchronization signal block (SSB), channel state information (CSI) reference signal (CSI-RS), and/or PRS. Alternatively or additionally, the SRSp resources configuration may include a periodicity of SRSp transmission and/or spatial direction information of SRSp transmission (e.g., beam information, angles of transmission). Alternatively or additionally, the SRSp resources configuration may include spatial direction information of DL RS reception (e.g., beam ID used to receive DL RS, angle of arrival). As part of the configuration, the WTRU may receive information related to the cell ID, global cell ID, and/or TRP ID which is associated with PRS. For example, the TRP, which transmits PRS, is identified by the TRP ID, which may belong to a cell identified by the cell ID. The WTRU may be configured with timing information such as subframe number (SFN) offset for PRS or SRSp transmission. The offset may be or is introduced to prevent the WTRU from receiving overlapping PRS in the time domain.

Representative Procedures/Methods for Supporting Positioning Service Continuity for DL-Based Positioning In one family of solutions, the WTRU performs positioning service continuity based on PRS/radio resource management (RRM) measurements. For example, the WTRU may initiate and perform positioning service continuity by sending a request to a network (e.g., the LMF and/or the RAN) for a new PRS configuration, when triggered by one or more configured positioning service continuity conditions. Positioning service continuity may refer to changing and/or updating, at the WTRU, the one or more PRS configurations associated with different TRPs/gNBs/cells in the network. The PRS configuration used may be changed for making measurements due to WTRU mobility and/or when the WTRU undergoes data link HO, for example. In another example, positioning service continuity may not be directly due to WTRU mobility, where the PRS configuration used may be changed for making measurements when the WTRU is able to detect one or more new TRPs/gNBs/cells (e.g., WTRU is able to receive the RS from the new TRPs/gNBs/cells, due to clearance of blockage). Henceforth, the terms 'positioning service continuity' and 'positioning mobility' may be used interchangeably to refer to any procedure which may result in the PRS configuration used at a WTRU and/or network to be changed/updated based on mobility and/or non-mobility events/triggers/conditions. Additionally henceforth, the term 'new PRS configuration' may also refer to 'update to PRS configuration' where the existing PRS configuration at a WTRU may be updated or replaced with a new/different PRS configuration or may contain at least in part certain overlap with the existing PRS configuration.

An LMF is a non-limiting example of a node or entity (e.g., network node or entity) that may be used for or to support positioning. Any other node or entity may be substituted for the LMF and still be consistent with this disclosure.

In an example, the positioning service continuity may be performed by a WTRU independently of the data link HO. Alternatively, the positioning service continuity may be performed together with or during the data link HO. The WTRU may send the request for assistance information and/or configuration update, where the assistance information/configuration update may contain the PRS configuration associated with a neighbour/target cell. In this case, The WTRU may send the request to the network via the serving gNB when in RRC CONNECTED or RRC INACTIVE state, for example.

Upon receiving the new PRS configuration from the network, the WTRU may perform the positioning measurements using a new configuration based on one or more positioning initiation triggers. The positioning initiation triggers, indicating when to use the new PRS configuration and/or when to stop using the existing PRS configuration, may be received by a WTRU from a network (e.g., the LMF and/or the RAN entity and/or the base station). For example, the WTRU may receive the positioning initiation triggers along with the new PRS configuration from the network, and/or preconfigured in the WTRU via other procedures (e.g., other LTE positioning protocol (LPP) procedures or location request procedures).

In an example, the WTRU may send the request for a new PRS configuration prior to or during conventional data link/RRC connection HO such that the PRS configuration of the target cell may be received and/or used for PRS measurements before HO. In this case, the PRS configuration may be received by the WTRU from the serving/source gNB. This would also enable possible minimization of the latency associated with sending the request and receiving the new PRS configuration and to avoid any positioning gaps where the WTRU may perform positioning measurements continuously during mobility without interruptions. In another example, the WTRU may send the request during and/or upon performing the data link HO and the new PRS configuration may be received from the target gNB.

In one scenario, the WTRU may send the request for a new PRS configuration in the case of inter-gNB mobility where the source/serving TRP/gNB and the target TRP/gNB may be configured with different PRS configurations. In this case, the WTRU may be initially configured with a first PRS configuration, when connected to a source/serving gNB. The first PRS configuration may be received by a WTRU either via assistance information from the LMF or via system information block (SIB) from the source gNB, for example. The WTRU may possibly be configured with a first measurement gap configuration by the serving gNB for performing the DL PRS measurement.

The WTRU may also be configured with a second measurement gap configuration for performing RRM measurements, which may include making measurements on the CSI-RS, SSB, and/or neighbour cell beams, for example. In this case, the first and second measurement gap configurations may span over non-overlapping time/frequency resources or span over one or more overlapping time/frequency resources, for example.

In another scenario related to intra-gNB mobility, where the source TRP and target TRP may be under the control of the same gNB, the WTRU may send the request for a new PRS configuration associated with a target TRP. The WTRU may send this request either directly to the serving gNB via the source TRP or to the LMF when the target TRP is not configured with the PRS configuration currently configured in the WTRU.

In both intra/inter-gNB mobility scenarios, the WTRU may detect the unavailability of the suitable PRS configuration and/or the usage of a different PRS configuration at the target TRP/gNB/cell based on the existing PRS configuration available at the WTRU. In this case, from the cell ID of the target/neighbour cell determined by the WTRU and mapping of the different cell IDs associated with the existing PRS configuration in the assistance information, the WTRU may identify whether the target/neighbour uses the same or different PRS configuration.

In certain examples, the WTRU may support positioning service continuity procedures with LPP. For example, a WTRU configured with one or more PRS configurations (e.g., indicating PRS information, patterns and/or parameters) for positioning, may perform positioning service continuity during mobility (e.g., a HO procedure, and/or a re-establishment procedure, among others) when supporting at least one LPP session/procedure. A WTRU may be triggered to support the LPP session/procedure for or upon deferred mobile terminated location request (MT-LR)), for WTRU-assisted positioning or for WTRU-based positioning, for example.

A representative procedure to perform positioning service continuity with LPP may include any of:

(1) the WTRU sending positioning capability information to the network (e.g. a network entity, a base station, a LMF and/or a gNB, among others) (for example, the WTRU may include capability information related to the WTRU mobility, including information regarding any of: (i) WTRU speed/velocity, (ii) expected WTRU speed/velocity, (iii) WTRU direction of movement, (iv) WTRU expected direction of movement, and/or (v) area (e.g., geographic area and/or area/cell IDs) in which the WTRU is expected to be mobile or roam, for example. The WTRU may include information on supporting positioning service continuity (e.g., requirement for support positioning measurements/reporting without interruptions), for example in an LPP message or access stratum (AS) layer message (e.g., RRC signaling) when sending the information to the network (e.g., a network entity, a base station, the LMF and/or the gNB, among others), for example. The positioning capability information may be provided by WTRU in an LPP provide capabilities message, for example. The WTRU may send the positioning capability information after or upon receiving an LPP request capabilities message from the network (e.g., for a MT-LR scenario) or when receiving a location service request from LCS-client/application (e.g., for a MO-LR scenario), for example);

(2) the WTRU receiving assistance information, indicating, containing and/or including one or more PRS configurations/parameters (for example, the WTRU may receive additional information associated with the PRS configurations, including any of: (i) validity conditions for using the one or more PRS configurations (e.g., area/cell IDs in which the PRS configurations are to be used, (ii) mobility conditions (e.g., speed and/or direction) which may be or may need to be satisfied for using certain PRS configurations). The assistance information may be received in one or more messages (e.g., LPP assistance data transfer messages). The WTRU may receive, e.g., the assistance data/information indicating and/or including a positioning mobility configuration containing and/or including one or more rules/conditions. The one or more rules and/or conditions may indicate/include one or more of the following: (a) timing information, (b) cell ID information and/or (3) RSRP thresholds of measurements, for example made on PRS or non-positioning RS/channels indicating when to release/stop the PRS configuration associated with a source cell/gNB/base station and start using a new PRS configuration associated with a target cell/gNB/base station during mobility. The WTRU may receive information indicating/including a reporting configuration. The report configuration may indicate information to include when the WTRU sends positioning reports including measurement reports and/or location estimates. For example, the reporting configuration may contain/include any of: information on cell IDs to report, periodicity for sending the positioning reports, and/or mobility information to report (e.g., the WTRU speed, expected speed, direction, expected direction, environmental conditions, expected environmental conditions, indoor/outdoor status, expected indoor/outdoor status), among others);

(3) the WTRU receiving the request for location information from the network (e.g., a network entity, a base station, a gNB, and/or the LMF, among others (for example, the request may indicate to initiate positioning measurements (e.g., in a message, for example a LPP request location information message). Upon or after receiving the request, the WTRU may use at least one PRS configuration which may satisfy the associated validity condition for performing measurements on the PRS. When the WTRU is connected to a source base station/gNB, the WTRU may use the PRS configuration associated with the source base station/gNB, for example. When undergoing or during HO to a target base station/gNB (e.g., for data link HO), which may be associated with a different PRS configuration, the WTRU may use the PRS configuration associated with the target gNB, for example. When the WTRU determines that the PRS configuration associated with the target gNB is unavailable (e.g. due to the PRS configuration: (i) not being preconfigured in WTRU, (ii) not provided to WTRU in LPP assistance data, and/or (iii) not accessible via posSIB), the WTRU may send an indication to the network (e.g., a base station, network entity, the LMF and/or the gNB, among others), for example to request for a new PRS configuration (e.g., in a LPP request assistance data message), for example to indicate the identifiers/IDs of the target base station/gNB. When the WTRU determines that the PRS configuration associated with target base station/gNB is available (e.g., preconfigured, provided via assistance data, and/or accessible via posSIB), the WTRU may send information or an indication to the network (e.g., a base station, a network entity, the LMF and/or the gNB, among others) indicating a change of the PRS configuration from that associated with the source base station/gNB to that associated with the target base station/gNB, for example. The WTRU may send the information or indication in a LPP message (e.g., a LPP provide location information message, and/or a LPP provide/request assistance information message, among others) and/or an access stratum (AS) layer message (e.g., via RRC signaling, a Media Access Control (MAC) Control Element (CE) and/or uplink control information (UCI)), for example);

(4) the WTRU performing measurements of PRS using a suitable PRS configuration before, during, and/or after a HO (for example, when supporting WTRU-assisted positioning, the WTRU may send the measurement report to the network (e.g., a base station, a network entity, the LMF and/or the serving gNB, among others). The WTRU may send the measurements to the LMF via a LPP provide location information message and may include or indicate information on the WTRU mobility (e.g., a time instance when receiving an HO command, a time instance when sending a HO complete message, and/or a time instance when changing to a different PRS configuration during mobility, among others). When supporting WTRU-based positioning, the WTRU may determine its location estimate based on the PRS measurements. When supporting MT-LR, and/or deferred MT-LR, the WTRU, for example, may send a location estimate to the LMF via a provide location information message, and may include information regarding the WTRU mobility. When supporting a mobile originated location request (MO-LR), the WTRU may send the location estimate to application/location services (LCS)-client/application, for example.

The contents of the request sent by a WTRU for a new PRS configuration may include various types of information. For example, the request may include information regarding a target TRP/gNB, such as a cell ID. Alternatively or additionally, the request may include information regarding measurements of a target/neighbour TRP/gNB, such as an RSRP measured on RRM measurements (e.g., SSB, CSI-RS) and PRS measurements. Alternatively, or additionally, the request may include information regarding a PRS configuration, such as a flag and/or identifier indicating an existing/new PRS configuration. Alternatively, or additionally, the request may include information regarding mobility, such as a mobility report containing the mobility path (e.g., list of one or more cell IDs traversed by WTRU and/or WTRU coordinates over a time duration) and/or WTRU mobility attributes (e.g., WTRU speed, direction, distance travelled in direct/straight path).

The WTRU may send the request for a new PRS configuration and/or updating/changing the existing PRS configuration in various ways. For example, the WTRU may send the request in a NAS message using at least one of the LPP procedures for sending the request for assistance information and/or a configuration update to an LMF. Alternatively, the WTRU may include the request in a positioning information, sent to a network, containing a positioning measurement report and/or location information. In another alternative, the WTRU may send the request in a positioning mobility report, possibly containing information on mobility. Alternatively, or additionally, the WTRU may send the request using RRC signalling, such as by sending the request for a new PRS configuration to a TRP/gNB in RAN, where the TRP/gNB may be associated with the serving/source or target cell. Alternatively, or additionally, the WTRU may send the request using layer 2/layer 1 (L2/L1) signaling, such as by sending the request to a serving gNB in MAC control element (CE) or uplink control information (UCI).

In one solution, the WTRU may be configured by a network with a positioning service continuity configuration, which may include one or more positioning service continuity conditions and/or configuration for supporting at least one positioning service continuity mode. In this case, both positioning service continuity conditions and the positioning service continuity modes may be configured in a WTRU either by the LMF or RAN (e.g., serving gNB via RRC). Alternatively, the positioning service continuity conditions may be configured by the LMF and the positioning continuity modes may be configured by RAN, for example.

Using the positioning service continuity configuration, enabling the support for service continuity and/or mobility may be supported for both WTRU-based and WTRU-assisted positioning. In the case of WTRU-based positioning, the WTRU may receive the suitable assistance information/configuration update and PRS configuration in a timely manner (e.g., before/during data link HO) based on WTRU mobility such that the WTRU is able to perform PRS measurements and determine its location information. Likewise, in the case of WTRU-assisted positioning, the WTRU may make PRS measurements using the PRS configuration received during mobility and send the measurement report via the serving gNB. In both WTRU-based and WTRU assisted positioning, the new PRS configuration may consist of one or more TRPs/gNBs which may be using similar PRS with that of the target TRP/gNB to which the WTRU undergoes data link HO, for example. Additionally, positioning mobility may also be supported for mobile originated location request (MO-LR) and mobile terminated location request (MT-LR) procedures, associated with WTRU-based and WTRU-assisted positioning, for example.

The positioning service continuity conditions, configured in a WTRU and/or monitored by a WTRU, may include a requirement that the WTRU send a request to a network (e.g., the LMF and/or the RAN entity and/or the base station) for a new PRS configuration or update/change the existing PRS configuration when triggered by one or more conditions. For example, a condition that can trigger the sending of the request may include unavailability of a suitable PRS configuration. For example, the WTRU may send a request upon determining that one or more target/neighbour cells (e.g., cell ID), which may be detected by the WTRU from SIB/SSB received from the target/neighbour cell, is currently not within the assistance information/configuration and/or existing PRS configuration available at the WTRU. Likewise, when the WTRU is able to or can receive at least a part/portion of the PRS from the target cell and does not have the associated PRS configuration, the WTRU may send a request for the new PRS configuration.

Another condition that can trigger the sending of the request may include one or more RRM measurement threshold(s). For example, the WTRU may request a new PRS configuration when the RRM measurements (e.g., RSRP of SSB, CSI-RS) associated with a target/neighbour cell are above a configured threshold and/or remain above the threshold for a certain configured duration. The threshold for sending the request for a new PRS configuration based on RRM measurements may be lower/higher than the thresholds configured for conventional data link HO, for example. In another example, thresholds for positioning service continuity and data link HO may be the same. In this case, the WTRU may include a positioning service continuity flag/indication in the RRM measurement report sent to the serving gNB for data link HO, for example. The serving gNB may forward the request for a new PRS configuration to the LMF (e.g., via new radio positioning protocol A (NRPPa)) or to the target gNB (e.g., via Xn) when performing the HO procedure, for example.

Another condition that can trigger the sending of the request may include a timer associated with existing PRS configuration(s). For example, the WTRU may send a request when a validity timer associated with one or more of the existing PRS configurations expire.

Another condition that can trigger the sending of the request may include an indication from the network/higher layer. For example, the WTRU may send a request for a new PRS configuration when receiving an indication from the serving gNB indicating the release of the existing PRS configuration and/or measurement gap configuration for PRS measurement. Likewise, the WTRU may send a request when triggered by the application/location services (LCS) client in a WTRU (e.g., MO-LR).

Another condition that can trigger the sending of the request may include a change in WTRU radio environment or WTRU attributes. For example, the WTRU may send a request for new PRS configuration when detecting certain attributes in the WTRU radio environment, including interference and/or multipath (e.g., measurements above/below a threshold).

Another condition that can trigger the sending of the request may include a change in WTRU attributes. For example, the WTRU may send a request for a new PRS configuration when detecting a change in WTRU attributes. An example of WTRU attributes includes an increase/decrease of WTRU velocity in a certain direction (e.g., away from the coverage area of one or more TRPs/gNBs where the existing PRS configuration is used). Another example of WTRU attributes includes a change in the WTRU orientation (e.g., in the direction opposite to where the beams associated with the existing PRS configurations are received). Another example of WTRU attributes includes change in the distance travelled by the WTRU by a certain distance threshold (e.g., along a straight/direct path). The WTRU may send the request in response to one or more of these or other conditions being met.

Another condition that can trigger the sending of the request may include data link HO triggers. For example, the WTRU may send a request for a new PRS when triggered by one or more conditions/signaling associated with a data link HO procedure. Example data link HO triggers include transmission of an RRM measurement report and/or reception of a radio resource control (RRC) Reconfiguration message (containing the HO Command) from a serving gNB, transmission of a connectivity establishment message (e.g., random access control channel (RACH), RRC signaling) to a target gNB, etc.

In an example, the WTRU may be configured to send positioning information (e.g., measurement report for WTRU-assisted positioning and/or location information for WTRU-based) to the LMF, when triggered by one or more positioning service continuity conditions, described above. The WTRU may send the positioning information via the serving gNB before/during the data link HO. In this case, the LMF may determine the provisioning of a new PRS configuration based on the positioning information sent by a WTRU and send the assistance information/configuration update containing the new/updated PRS configuration to the WTRU, possibly upon configuring the new PRS configuration at one or more target TRPs/gNBs. In an example, the positioning information sent by the WTRU, based on the above triggering conditions, may include a positioning service continuity report.

In another example, one or more PRS configurations may be preconfigured in the WTRU, possibly along with the mapping between the positioning service continuity conditions and the associated PRS configurations. The different PRS pre-configurations may also be associated with one or more groups of TRPs/gNBs (e.g., ID of TRPs/gNBs). In this case, the WTRU may select a new PRS configuration from the list of pre-configurations and/or release an existing PRS configuration when detecting one or more positioning service continuity conditions. The selected new PRS configuration may then be used for requesting for an associated measurement gap configuration and/or performing PRS measurement, for example.

Additionally, the positioning service continuity configuration received by a WTRU may also include various positioning service continuity modes. For example, a positioning service continuity mode included in the configuration may indicate usage of a new PRS configuration of a target gNB before the data link HO, while in the coverage area of a source gNB. Alternatively, or additionally, a positioning service continuity mode included in the configuration may indicate usage of an existing PRS configuration of a source gNB after the data link HO, while in the coverage area of a target gNB. Alternatively, or additionally, a positioning service continuity mode included in the configuration may indicate usage of both PRS configurations of a source gNB and a target gNB during the data link HO.

The WTRU may use one or more of the positioning service continuity modes based on an indication received from the network (e.g., a same or different indication containing the new PRS configuration) or autonomously determined by a WTRU based on triggers similar to the positioning service continuity conditions, described above.

The WTRU may receive one or more RAN configurations (e.g., RAN configuration information) associated with positioning to be applied during mobility. For example, the WTRU may receive a RAN configuration (e.g., RAN configuration information) from a serving gNB (e.g., a source base station/gNB) or a target base station/gNB, which may be applied by the WTRU before, during, and/or after a HO while continuing to support positioning procedures. The RAN configuration described herein may include any of the following attributes/parameters/information and may be applicable to various embodiments disclosed herein:

(1) one or more Measurement gap (MG) configurations (for example, the WTRU may be configured with a first MG configuration when using a first PRS configuration associated with the source base station/gNB/cell (e.g., before and/or during the HO) and/or a second MG configuration when using a second PRS configuration associated with the target base station/gNB/cell (e.g., during and/or after the HO));

(2) one or more Configured grant (CG) configurations (for example, for the purpose of sending measurements, reports and/or location estimates as per the associated PRS measurements and/or reporting configurations, the WTRU may be configured with a first CG configuration when associated with the source gNB/cell (e.g., before and/or during the HO) and a second CG configuration when associated with the target gNB/cell (e.g., during and/or after the HO). In another example, the WTRU configured with a CG configuration by the source gNB/cell may continue using the same or an updated CG configuration during or upon an undergoing HO when receiving an indication from the source or target gNB/cell, indicating that the WTRU may be allowed to use the CG configuration; and/or (3) Timing advance (TA) configuration (for example, for supporting UL-based positioning, the WTRU may be configured with a first TA configuration, including a TA timer (TAT) (e.g., timer parameters/information), when using a first SRSp configuration associated with the source gNB/cell (e.g., before and/or during the HO) and a second TA configuration when using a second SRSp configuration associated with the target gNB/cell (e.g., during and/or after the HO). The WTRU may use the first SRSp configuration, for example, on condition that or so long as the TAT associated with the first TA configuration is valid (e.g., a condition for the TA configuration is valid and/or a time interval associated with that TAT has not expired), and the WTRU may use the second SRSp configuration on condition that or so long as the TAT associated with the second TA configuration is valid (e.g., a condition for the TA configuration is valid and/or a time interval associated with that TAT has not expired). The first and second TA configurations may be received by the WTRU from the source gNB/cell and/or from the target gNB/cells, for example.

In some examples, the TA configurations (e.g., using the TAT) may be associated with CG configurations and/or PRS configurations. The WTRU may use the one or more TA configurations provided by the source/target gNBs/cells when determining/deciding which of the one or more CG configurations to be used during mobility and/or when performing positioning measurements/reporting. For example, the WTRU may use a first CG configuration on condition that or so long as the TAT associated with a first TA configuration is valid, and the WTRU may use a use a second CG configuration on condition that or so long as the TAT associated with a second TA configuration is valid, among others).

In some situations, a WTRU may send a request for a new PRS configuration for supporting positioning mobility to a serving gNB. For example, where the LMF functionality may be supported in RAN, the WTRU may send the request for supporting positioning service continuity (e.g., request for a new PRS configuration) to the serving gNB based on detection of one or more configured positioning service continuity conditions.

The WTRU may send the request for positioning service continuity in RRC signaling, UL MAC CE, and/or UCI either before or during the data link HO. The serving gNB may then send the request to the LMF and/or directly to the target cells/gNBs for a new PRS configuration associated with one or more target cells/gNBs. The LMF or the target cell/gNB may forward the associated PRS configuration to the serving gNB for supporting positioning mobility/service continuity. The WTRU may receive from the serving gNB the new PRS configuration and/or an indication for using/activating a (new) PRS (pre)configuration via RRC signaling, DL MAC CE, and/or downlink control information (DCI). The new PRS configuration may be received by the WTRU either in the RRCReconfiguration message (e.g., along with a HO command) or in a different message before/during the data link HO. The WTRU may then perform measurements of DL-PRS using the received/activated new PRS configuration and send the measurement report to the current serving gNB.

In some situations, the WTRU may receive a new/updated PRS configuration upon sending a positioning service continuity report. For example, the WTRU may receive the new/updated PRS configuration from the network (e.g., the LMF and/or the RAN entity and/or the base station) based on a positioning service continuity report sent by the WTRU. For example, the WTRU may indicate information related to the IDs of the target/neighboring cells and/or RRM measurements associated with the target/neighboring cells in the positioning service continuity report, regardless of whether the target cells/gNBs use the same or different PRS configuration available at the WTRU. The WTRU may send information related to WTRU mobility attributes such as speed, direction, and/or orientation in the positioning service continuity report. In another example, the WTRU may send the mobility status indication to a network in an LPP measurement report or in a separate positioning mobility report. The WTRU may send the positioning service continuity report when triggered by one or more triggering conditions described above, for example.

The positioning service continuity report may be sent via the serving gNB either periodically or based on one or more conditions described above (e.g., when RSRP of neighbor cell is above a threshold, when triggered by the data link HO). For example, the WTRU may increase the transmission periodicity for the positioning service continuity report when the WTRU speed increases for providing more accurate assessment of the WTRU location to the network. The WTRU may change from a first reporting periodicity to a second reporting periodicity, where the second periodicity may be higher than the first periodicity, when the WTRU undergoes the data link HO, for example. In another example, the WTRU may be configured with a group consisting of one or more TRPs/gNBs associated with the PRS configuration available at the WTRU. The WTRU may also be configured with markers associated with one or more TRPs/gNBs which indicate the WTRU sending of a positioning service continuity report to the network when the WTRU detects the TRPs/gNBs IDs with the markers.

In response to sending the positioning service continuity report, the WTRU may receive the new/updated PRS configuration, possibly along with information on when to start the usage of the new PRS configuration and stop/release the usage of an existing PRS configuration. The new/updated PRS configuration may be received prior to the data link HO and/or independently of the data HO procedure. The receipt may be based on a determination of the WTRU location within a positioning area (e.g., area associated with a group of TRPs/gNBs in which the existing PRS configuration applies and may be used by the WTRU for positioning measurement). The receipt may also be based on coordination between the TRPs/gNBs and the LMF. The WTRU may receive the new/updated PRS configuration periodically as the WTRU undergoes the HO to different cells, for example.

The resources for sending the positioning information to a network, containing at least the positioning service continuity report and/or measurement report, may be received by the WTRU from the serving gNB. These resources may be received as a dynamic grant or configured grant based on the request for resources (e.g., scheduling request (SR)/buffer status report (BSR) or RRC assistance information) sent by the WTRU. In an example, the WTRU may send a request for a configured grant to the serving cell for sending positioning information. The WTRU may also indicate the usage of the configured grant during/after the HO for sending the positioning information containing the measurements made during the HO. In this case, the serving gNB may transfer the context associated with the configured grant to the target gNB and indicate to the WTRU certain conditions for using the configured grant. For example, the WTRU may use the same configured grant, at least for the initial transmission and/or possibly within a certain validity duration, upon the HO to the target gNB.

In another solution, when the WTRU undergoes data link the HO to a target cell, where the target cell may possibly be within an existing PRS configuration available at the WTRU, the LMF may receive an indication from the RAN of the WTRU mobility status. Based on the mobility status, the LMF may send an update to the WTRU containing an updated PRS configuration. In this case, the updated PRS configuration may contain information on one or more new TRPs/gNBs which the WTRU may use for PRS measurements.

The updated PRS configuration received by the WTRU may also contain information related to the TRPs/gNBs which are of higher importance/priority for the WTRU to make PRS measurements and increase the positioning accuracy, for example. In an example, as the WTRU undergoes HO from a source cell to a target cell, the importance of the source cell in the updated PRS configuration switches from a higher value to a lower value since the previous source cell becomes a neighbor cell after the HO.

The updated PRS configuration may be received by the WTRU either periodically or based on the mobility status. For example, the updated PRS configuration may be received more frequently with higher periodicity when the WTRU moves with higher speed or the rate of HO to one or more target cells is high.

In some situations, a WTRU uses the PRS configuration of a target gNB before the HO in the coverage area of a source gNB. For example, a WTRU configured with the new PRS configuration associated with the target TRP/gNB may use the new PRS configuration when still connected with the source TRP/gNB over the data/RRC link. In this case, the new PRS configuration of the target TRP/gNB may be used by the WTRU for performing positioning measurements when in the coverage area of the source TRP/gNB prior to the data link HO. When using the new PRS configuration, the WTRU may extend, release, and/or suspend the existing PRS configuration, possibly when the WTRU is under the coverage of the source TRP/gNB, for example.

The WTRU may start using the new PRS configuration based on various PRS usage triggers configured in the WTRU. An example trigger for starting use of the new PRS configuration may include reception of the new PRS configuration. In this example, the WTRU may use the new PRS configuration either immediately or within a certain configured duration. In this case, the WTRU may start a timer upon reception and use the new PRS configuration upon expiry of the timer, for example.

Another example trigger for starting use of the new PRS configuration may include RRM/PRS measurements of a target cell. For example, the WTRU may use the new PRS configuration when the RSRP of the SSB and/or neighbour cell RS is above a threshold value and/or remains above a threshold value for a configured duration. Likewise, the WTRU may start using the new PRS configuration when the RSRP measurement of the PRS received from the target cell is above a threshold value.

Another example trigger for starting use of the new PRS configuration may include target cell ID detection. For example, the WTRU may use the new configuration when detecting the target cell ID in the SIB/SSB received from the target cell.

Another example trigger for starting use of the new PRS configuration may include reception of an indication from a network. For example, the WTRU may start using the new PRS configuration upon receiving the indication from the LMF (e.g., in a LPP location request), or RAN (e.g., in MAC CE or DCI).

Another example trigger for starting use of the new PRS configuration may include priority. For example, the new PRS configuration may be used when the priority associated with the new PRS configuration is higher than or equal to the existing PRS configuration or other data transmission/reception.

Another example trigger for starting use of the new PRS configuration may include data/signaling transmission. For example, the WTRU may start using the new PRS configuration upon completion of data/signaling transmission/reception over dedicated resource bearers/signalling resource bearers (DRBs/SRBs). Alternatively, or additionally, the WTRU may start using the new PRS configuration upon determining that there are no buffered or pending data/signaling transmission/reception in a subsequent configured time duration/slots.

Another example trigger for starting use of the new PRS configuration may include data link HO triggers. For example, the WTRU may use the new PRS configuration either before or after transmission of the RRM measurement report containing neighbor cell measurements, possibly for triggering the data link HO. Alternatively, the WTRU may start using the new PRS configuration upon receiving the HO command, which may possibly contain an explicit or implicit indication for starting the use of the new PRS configuration.

Another example trigger for starting use of the new PRS configuration may include alignment with a measurement gap configuration. For example, the WTRU may use the new PRS configuration upon sending a request (e.g., in RRC) for a measurement gap or reception of a measurement gap configuration associated with a new PRS configuration of a target TRP/gNB/cell. In this case, the request and/or response for the measurement gap configuration may be performed by the WTRU via the serving TRP/gNB.

When using the new PRS configuration, the WTRU may extend, stop, and/or release the existing PRS configuration or continue using the new and existing PRS configurations with at least an overlap of one or more time/frequency resources used for PRS. The possible combination of usage of the new and existing PRS configurations may be received by the WTRU in the assistance information/configuration update from the network or determined by the WTRU. For example, the WTRU may determine the usage of a new PRS configuration along with the existing PRS configuration, at least with an overlap of one or more time/frequency resources between the configurations, for improving the positioning accuracy. In this case, the WTRU may use one or more combinations of PRS configurations when determining the positioning accuracy achieved with measurements with the existing PRS configuration is below an accuracy threshold, for example, due to interference or fluctuations in the WTRU radio environment.

FIG. 2 is a system diagram illustrating a WTRU receiving downlink (DL)-positioning reference signal (PRS) from a target TRP/gNB while connected to a source TRP/gNB according to an embodiment.

Referring to FIG. 2, a first coverage area 208 associated with a source TRP/gNB 202 may overlap with a second coverage area 206 associated with a target TRP/gNB 204. A WTRU 200 may use a PRS configuration of the source TRP/gNB 202 after a HO in the coverage area 206 of the target TRP/gNB 204. For example, the WTRU 200 configured with the new PRS configuration associated with the target TRP/gNB 204 may continue using the existing PRS configuration associated with the source TRP/gNB 202 after performing the data link HO to and/or establishing data/RRC connection with the target TRP/gNB 204. In this case, the PRS configuration of the source TRP/gNB 202 may be used by the WTRU 200 for performing positioning measurements when in the coverage area 206 of the target TRP/gNB 204 after the data link HO.

The WTRU 200 may release/update the existing PRS configuration, associated with the source TRP/gNB 202, based on various triggering conditions configured in the WTRU 200. One example trigger condition for release/update of the existing PRS configuration may include reception of a new PRS configuration. For example, the WTRU 200 may release/update the existing PRS configuration upon receiving the new PRS configuration of the target TRP/gNB 204 from the target TRP/gNB 204.

Another example trigger condition for release/update of the existing PRS configuration may include RRM/PRS measurements of a source cell. For example, the WTRU 200 may release/update the existing PRS configuration when the RSRP of the SSB and/or the source cell RS is below a threshold value and/or remains below a threshold value for a configured duration. Likewise, the WTRU 200 may release/update the existing PRS configuration when the RSRP measurement of the PRS received from a source cell is below a threshold value.

Another example trigger condition for release/update of the existing PRS configuration may include reception of an indication from a network. For example, the WTRU 200 may release/update the existing PRS configuration and start using the new PRS configuration upon receiving the indication from the LMF (e.g., in a LPP location request), or RAN (e.g., in MAC CE or DCI).

Another example trigger condition for release/update of the existing PRS configuration may include timer expiry. For example, the WTRU 200 may release/update the existing PRS configuration within a certain time duration during/upon performing the data link HO to the target cell. In this case, the WTRU 200 may start a timer upon receiving the HO command/RRCReconfiguration message from the source TRP/gNB 202 or upon sending the RACH/radio resource control (RRC) message to the target TRP/gNB 204 for connection establishment. the WTRU 200 may then release/update the existing PRS configuration upon the expiry of the configured timer.

Another example trigger condition for release/update of the existing PRS configuration may include a priority. For example, the existing PRS configuration may be released/updated when the priority associated with the new PRS configuration is higher than or equal to the existing PRS configuration or other data transmission/reception.

Another example trigger condition for release/update of the existing PRS configuration may include data/signaling transmission. For example, the WTRU 200 may release/update the existing PRS configuration upon completion of data/signaling transmission/reception over DRBs/SRBs and/or determining that there are no buffered or pending data/signaling transmission/reception in a subsequent configured time duration when connected to the target TRP/gNB 204.

Another example trigger condition for release/update of the existing PRS configuration may include data link HO triggers. For example, the WTRU 200 may release/update the existing PRS configuration either before or after transmission of the RRM measurement report containing neighbor cell measurements for triggering the data link HO. Alternatively, the WTRU 200 may release/update the existing PRS configuration upon receiving the HO command, which may possibly contain explicit or implicit indication for releasing the existing PRS configuration.

Another example trigger condition for release/update of the existing PRS configuration may include alignment with a measurement gap configuration. For example, the WTRU 200 may release/update the existing PRS configuration upon sending a request (e.g., in RRC) for a measurement gap or reception of a measurement gap configuration associated with a new PRS configuration of a target TRP/gNB/cell. In this case, the request and/or response for the measurement gap configuration may be performed by the WTRU 200 via the target TRP/gNB 204, for example.

Another example trigger condition for release/update of the existing PRS configuration may include a revert/fault condition. For example, after receiving the new PRS configuration, the WTRU 200 may revert to using the existing PRS configuration without releasing when the new PRS configuration is unable to satisfy certain positioning accuracy conditions (e.g., RSRP of the PRS measured with below a threshold) or due to other fault conditions with the new PRS configuration. The WTRU 200 may also revert to an existing PRS configuration when unable to receive the measurement gap configuration associated with PRS configuration of the target TRP/gNB 204, for example.

Upon releasing/updating the existing PRS configuration, the WTRU 200 may start using the new PRS configuration for performing the positioning measurements in the coverage area 206 of the target TRP/gNB 204. The WTRU 200 may use the new PRS configuration upon sending and/or receiving the measurement gap configuration associated/aligned with the new PRS configuration of the target TRP/gNB 204, for example.

In an example where the same PRS configuration is used by both the source TRP/gNB 202 and the target TRP/gNB 204, the WTRU 200 can continue using the existing PRS configuration without releasing or updating the configuration after the HO. In this case, the WTRU 200 may receive an indication from the source TRP/gNB 202 (e.g., in a HO command), possibly to suspend making measurements using the existing measurement gap configuration during the HO and/or resume making measurements using the same measurement gap configuration after the HO. In this case, upon performing the HO, the WTRU 200 may explicitly indicate to the target TRP/gNB 204 the usage of the existing measurement gap configuration (e.g., in RACH message, RRC signaling, MAC CE, and/or UCI) or implicitly by resuming making measurements using the existing measurement gap configuration.

FIG. 3 is a system diagram illustrating a WTRU receiving DL-PRS from a source gNB while connected to a target gNB.

Referring to FIG. 3, a first coverage area 308 associated with a source TRP/gNB 302 may overlap with a second coverage area 306 associated with a target TRP/gNB 204. The WTRU 300 may use the PRS configuration of the source TRP/gNB 302 and PRS configuration of the target TRP/gNB 304 during data link HO. For example, the WTRU 300 configured with the new PRS configuration associated with the target TRP/gNB 304 along with the existing PRS configuration associated with the source TRP/gNB 302, may use both PRS configurations during the data link HO. The use of both PRS configurations may be intended for increasing positioning measurement accuracy and reliability, for example.

In this case, the WTRU 300 may use both PRS configurations for performing positioning measurements based on the PRS received from both the source TRP/gNB 302 and the target TRP/gNB 304. For using both PRS configurations, the WTRU 300 may start using the new PRS configuration while continuing to use the existing PRS configuration before the HO. In this case, the WTRU 300 may send a request to a serving gNB to extend/change the existing measurement gap configuration such that the updated measurement gap configuration spans over both the existing and the new PRS configurations, for example.

The WTRU 300 may suspend making measurements using the extended measurement gap configuration for a certain duration during the HO for supporting the one or more signaling/functions associated with the data link HO, for example. Upon completion of the HO, the WTRU 300 may resume making measurements using the extended measurement gap configuration until conditions for releasing/updating the PRS configuration of the source TRP/gNB 302 are met (e.g., RSRP of PRS drops below a threshold), for example. In this case, after releasing/updating the PRS configuration of the source TRP/gNB 302, the WTRU 300 may revert to using the new PRS configuration of the target TRP/gNB 304, possibly along with the associated reduced/updated measurement gap configuration. The WTRU 300 may transition from using the extended measurement gap configuration to the reduced/updated measurement gap configuration either based on sending an explicit request to the target gNB for changing the measurement gap configuration or by implicitly using the measurement gap configuration aligned with the new PRS configuration.

FIG. 4 is a system diagram illustrating a WTRU receiving a DL-PRS from a source gNB and a target gNB during HO according to an embodiment.

Referring to FIG. 4, a first coverage area 408 associated with a source TRP/gNB 402 may overlap with a second coverage area 406 associated with a target TRP/gNB 404. The WTRU 400 may determine the usage of a PRS configuration based on a measurement gap configuration. For example, in implementations for which measurement gap configurations are applied for performing PRS measurements, the WTRU 400 may send a request to the serving gNB requesting for configuration/configuration information of the measurement gap associated with the new PRS configurations of one or more target gNB/cells. In this case, the request for configuration of the measurement gap may be sent in RRC signaling, a MAC CE, and/or UCI upon the reception of a new PRS configuration. Determination of the size/length (e.g., in time domain and/or frequency domain) of the measurement gap configuration may be based on the new and/or existing PRS configurations, for example. The WTRU 400 may perform the positioning measurements using either the existing or new PRS configurations when the WTRU 400 is configured with a suitable and valid measurement gap configuration, for example.

In an example, the WTRU 400, which may be configured with a measurement gap configuration for performing measurements using an existing PRS configuration, may suspend making measurements using the measurement gap configuration in accordance with the new PRS configuration. In this case, a WTRU may perform various operations. For example, the WTRU 400 may perform an operation that entails suspending/releasing the measurement gap configuration associated with the existing PRS configuration. In this case, the WTRU 400 may be configured by a network with rules for determining how/when to suspend/release the existing measurement gap configuration. Hereafter, suspending/releasing the measurement gap configuration may refer to the WTRU 400 suspending/ceasing making PRS measurements using the measurement gap configuration. In an example, the suspending/releasing of the measurement gap configuration may correspond to updating the measurement gap configuration. The WTRU 400 may suspend/release the measurement gap configuration when one or more conditions associated with using a PRS configuration are met, for example. The WTRU 400 may send a request to a network for a new measurement gap configuration upon suspending/releasing the existing measurement gap configuration, for example. When the WTRU 400 suspends the existing measurement gap configuration without releasing, the WTRU 400 may return to using the measurement gap configuration for making PRS measurement upon sending the request for a new measurement gap, for example.

Another operation that may be performed by the WTRU 400 entails dynamically updating the measurement gap. For example, the WTRU 400 may update the measurement gap configuration, dynamically, upon receiving the new PRS configuration and/or determining the updated measurement gap configuration. In this case, the updated measurement gap configuration may be a new measurement gap configuration which may not contain any overlapping time/frequency resources that overlap with time/frequency resources of a measurement gap of a previous configuration. For example, the WTRU 400 may determine the new measurement gap configuration based on the received new PRS configuration. Alternatively, the updated measurement gap configuration may contain one or more overlapping time/frequency resources or extend the existing measurement gap configuration. The WTRU 400 may send an indication to a network indicating the updated measurement gap configuration (e.g., delta change from the existing measurement gap configuration).

In an example, the request for suspending/releasing/updating the existing measurement gap configuration may be sent explicitly in the same request for configuring a new measurement gap configuration. In this case, the response received by the WTRU 400 may contain the command for suspending/releasing/updating the existing measurement gap and configuration of a new measurement gap. In another example, the request for suspending/releasing the existing measurement gap is implicitly indicated via the request for a new measurement gap configuration. Alternatively, the request and response for suspending/releasing/updating an existing measurement gap configuration and new measurement gap configuration may be performed via separate signaling.

In another example, the WTRU 400 may start using the new measurement gap configuration upon receiving the response from the network (e.g., the source TRP/gNB 402 or the target TRP/gNB 404) containing information on the measurement gap configuration (e.g., time/frequency resources associated with measurements or an ID of a measurement gap). The WTRU 400 may stop using the existing measurement gap configuration either after sending the request or upon receiving the new measurement gap configuration from the network. Alternatively, the WTRU 400 may stop using the existing measurement gap configuration upon expiry of a configured timer, which may be set upon after sending the request or receiving the network response containing the new measurement gap configuration.

In another example, the WTRU 400 configured with a measurement gap configuration associated with the PRS configuration of the target TRP/gNB 404 may perform the measurements of the PRS received from the target TRP/gNB 404 when the WTRU 400 is under the coverage of the source TRP/gNB 402. In another example, the WTRU 400 may use the measurement gap configuration associated with the existing PRS configuration of the source TRP/gNB 402 for measuring the PRS received from the source TRP/gNB 402 after the HO when the WTRU 400 is under the coverage of the target TRP/gNB 404.

In another example, the WTRU 400 may suspend/release the measurement gap configuration, including measurement gaps associated with existing and/or new PRS configurations, for ensuring the signalling/functions associated with the data link HO can be supported during the HO. In this case, the data link HO signaling/functions may include transmission of RRM measurement reports, reception of RRC Reconfiguration message/HO Command, reception of synchronization signals from a target cell (e.g., primary synchronization signal (PSS), secondary synchronization signal (SSS)), and/or transmission of connection establishment messages (e.g., RACH/RRC signalling). In one example, when configured with the measurement gap associated with the new PRS configuration, the WTRU 400 may suspend the measurement gap configuration and making of measurements on the PRS received from the target cell to support the HO signaling/functions during the HO. In another example, the WTRU 400 may suspend/release the measurement gap configuration associated with the existing PRS configuration and making of measurements on the PRS received from the source cell to support the signaling/functions during the HO. Upon the completion of the HO signalling, the WTRU 400 may then resume the suspended measurement gap configuration for performing the PRS measurements. The WTRU 400 may continue using the measurement gap configuration after the HO until one or more release conditions associated with releasing the measurement gap configuration (e.g., triggers for using new PRS configuration, timer expiry, and/or network indication) are met.

In another example, the WTRU 400 may be configured with one or more priority rules for using the measurement gap configuration when the configuration overlaps with signaling/functions associated with the HO. For example, the priority rules may indicate suspending/releasing the measurement gap configuration associated with positioning measurements when the WTRU 400 is sending an RRM measurement report to a serving gNB in RRC signaling, possibly due to higher priority assigned to the RRC signaling than positioning measurements. When higher priority is assigned for positioning measurements, the WTRU 400 may resume positioning measurements with the configured measurement gap upon sending the RRC signaling or after receiving the RRCReconfiguration message containing a HO command from the serving gNB, for example. In this case, different HO related signaling/functions may be associated with different priority values and the WTRU 400 may support one of more of the signaling/functions, including the positioning measurements and reporting based on the order of priority, for example.

In another example, the priority rules configured in the WTRU 400 may indicate that the WTRU 400 should not suspend/release the measurement gap configuration associated with positioning measurements when the WTRU 400 is triggered by one or more data link signaling/functions associated with the HO. In this case, when the signaling/functions associated with the data link HO are performed over an active bandwidth part (BWP) that may be overlapping/non-overlapping with the bandwidth/resources associated with PRS measurements, the WTRU 400 may continue performing the PRS measurements using the configured measurement gap configuration while continuing to transmit/receive the HO related signaling during the HO, for example. Upon completing the HO procedure (e.g., the WTRU 400 establishes connectivity with the target TRP/gNB 404), the WTRU 400 may revert to performing (e.g., only performing) the PRS measurements using the configured measurement gap configuration, for example. In this example, the skipping of the rule for performing either PRS measurements or transmission/reception of data/signaling over an active BWP may be to ensure the positioning accuracy is maintained and also to avoid any positioning gaps, for example.

For reducing the latency associated with the signalling/procedure for configuring a measurement gap configuration, the WTRU 400 may be preconfigured with one or more measurement gap configurations by the source gNB. The measurement gap pre-configurations may be associated with existing and/or new PRS configurations. The WTRU 400 may trigger the activation of a preconfigured measurement gap during the HO by sending the indication related to the measurement gap (e.g., identifier) to the target TRP/gNB 404 in a RACH message and/or RRC signaling. In this case, for different measurement gap pre-configurations, the WTRU 400 may be configured with one or more RACH resources/preamble by the serving gNB. During/upon the HO to the target TRP/gNB 404, the WTRU 400 may determine the measurement gap configuration to be used at the target TRP/gNB 404. For example, when the WTRU 400 may use the new PRS configuration associated with the target TRP/gNB 404 after the HO, the WTRU 400 may send the RACH message using RACH resources/preamble corresponding with the new measurement gap configuration to the target TRP/gNB 404. In this case, the transmission of the corresponding RACH message by the WTRU 400 is to indicate to the network the starting of the use of a new PRS configuration, and the associated measurement gap configuration at the target TRP/gNB 404. In another example, where the WTRU 400 uses the existing PRS configuration associated with the source TRP/gNB 402, the WTRU 400 may send the RACH message using RACH resources/preamble corresponding with the existing/previous measurement gap configuration to the target TRP/gNB 404. The transmission of the corresponding RACH message by the WTRU 400 is to indicate the usage of the existing PRS configuration, and the associated measurement gap configuration after the HO to the target TRP/gNB 404.

In another example, where the WTRU 400 uses the new PRS configuration associated with the target TRP/gNB 404 before the HO, the context associated with the measurement gap configuration aligned with the new PRS configuration may be transferred from the target TRP/gNB 404 to the source TRP/gNB 402 (e.g., via Xn interface). In this case, the WTRU 400 may receive an indication from the source TRP/gNB 402, indicating possibly the identifier of the configured measurement gap configuration, so that the WTRU 400 may use the new PRS configuration with the measurement gap configuration before the HO.

In another example, where the WTRU 400 may continue using the existing PRS configuration associated with the source TRP/gNB 402 after the HO to the target TRP/gNB 404, the context associated with the measurement gap configuration aligned with the existing/previous PRS configuration before the HO may be transferred from the source TRP/gNB 402 to the target TRP/gNB 404 (e.g., via Xn interface). In this case, the WTRU 400 may send an indication to the target TRP/gNB 404 upon the HO (e.g., in RRC signaling, RACH, MAC CE, and/or UCI), possibly containing the identifier of the configured measurement gap configuration, so that the WTRU 400 may use the existing PRS configuration with the measurement gap after the HO.

In various implementations, including implementations described above with reference to FIGS. 2-4, the WTRU may send information on positioning measurements to a serving gNB/cell in RAN for assisting with the data link HO. For example, the WTRU may assist the RAN for performing conventional the data link HO based on positioning measurements. In this case, a WTRU which may receive the PRS from one or more target/neighbor cells may send positioning information to a serving gNB containing a measurement report of the PRS measurements. The additional information that the WTRU may include in the measurement report for assisting the RAN may include the change in the distance, possibly over a certain time duration, between the WTRU and the target/neighbor TRP/gNB determined based on the PRS measurements, for example. The serving gNB may use the PRS measurement report and/or the change in distance information reported by the WTRU for determining at least one of the target TRPs/gNBs to which the WTRU may potentially perform the data link HO.

The positioning information sent by the WTRU may also be used by the RAN for assisting with a conditional HO procedure. In this case, one or more candidate target gNBs for HO may be selected, for example, based on the positioning information sent by the WTRU. Then the serving gNB may also provide certain conditions (e.g., one or more thresholds associated with RSRP of PRS and/or RRM measurements) to the WTRU for evaluation before determining a target gNB for performing the data link HO. Alternatively, the WTRU may send an early request to the serving cell for the data link HO to a target cell based on the PRS measurements and/or distance measurements. The request sent by WTRU may trigger the HO preparation procedure between the serving gNB and the indicated target gNB, for example.

The WTRU may use validity conditions for determining the PRS configurations to apply during mobility. In some examples, the WTRU may use validity conditions associated with one or more PRS configurations for determining when to start and/or stop using the PRS configurations associated with the source base station/gNB/cell and the target base station/gNB/cell during mobility. The validity conditions may be received by the WTRU from the network (e.g., a network entity, a base station, the LMF and/or the gNB, among others) in (i) one or more LPP messages (e.g., a LPP provide assistance data message, (ii) a LPP request location information message, among others), (iii) a positioning service request message (e.g., for MT-LR, deferred MT-LR, and/or MO-LR), and/or (iv) an AS layer message (e.g., via RRC signaling, a MAC CE, and/or DCI), for example. In some examples, the validity condition or conditions received by the WTRU may be associated with the condition or conditions configured when the WTRU supports deferred MT-LR service/procedures. The validity conditions, associated with PRS configurations may include or indicate any of the following:

(1) one or more area validity conditions (e.g., area validity information) (for example, the cell IDs, RAN notification area (RNA), and/or a CN area in which the PRS configurations may be valid for usage. In certain examples, the WTRU may be configured with a first set of PRS configurations which are to be used by the WTRU when in a first validity area (e.g., under coverage of first set of cells/gNBs/base stations) and a second set of PRS configurations which are to be used by the WTRU when in a second validity area (e.g., under coverage of second set of cells/gNBs/base stations);

(2) one or more time validity conditions (e.g., time validity information) (for example, the time duration e.g., from a start time to an expiry time) in which the PRS configurations may be valid for usage. The WTRU may start a timer (apply an expiry period) upon receiving an indication to start using a PRS configuration (e.g., via a LPP location request and/or a HO command) and may use the configuration for PRS measurements on condition that the timer/expiry period is valid within the configured duration and/or is not expired, for example);

(3) one or more mobility condition of WTRU (e.g., mobility information (for example, the WTRU may use one or more PRS configurations when: (i) the WTRU speed is below/above a configured speed threshold value; and/or (ii) the amount and/or rate of movement/orientation of WTRU increases/decreases by a certain threshold value);

(4) one or more radio environment conditions of the WTRU (e.g., radio environment information (for example, the WTRU may change from a first set consisting of one or more PRS configurations to a second set when: (i) the RSRP of measurements made on PRS or non-positioning RS/channels (e.g., CSI-RS, SSB) associated with the first set are above/below an RSRP threshold value), (ii) detecting that a number of multipaths are above/below a threshold and/or (iii) Non-Line Of Sight (NLOS) conditions are detected, among others);

(5) an RRC state condition of the WTRU (e.g., whether the WTRU is in CONNECTED state, INACTIVE state, or IDLE state) (for example, the WTRU may change from using a first set consisting of one or more PRS configurations to second set when operating in different RRC states before, during and/or after the HO. As one example, the WTRU may use a first set of PRS configurations when operating in RRC CONNECTED state, a second set of PRS configurations when operating in RRC INACTIVE state and/or a third set of PRS configurations when operating in RRC Idle state. The first, second and third sets associated with different RRC states may contain or include a subset of PRS configurations which may be common across all sets, for example. Alternatively, the PRS configurations may be mutually exclusive across the different sets associated with the different RRC states.

When one or more of the PRS configurations are determined by the WTRU to be no longer valid (e.g., one or more validity conditions indicate expiry of the one or more PRS configurations) or not satisfied, the WTRU may perform any of the following:

(1) send and indication to the network (for example, the WTRU may send information or an indication to the network indicating a PRS configuration identifier/ID and/or the expiry status of the configuration. The WTRU may indicate to update the PRS configuration and/or to update the one or more validity conditions associated with the indicated PRS configuration. The information or indication sent to the network may be sent in or as an LPP message, an on-demand PRS message (e.g., to a network entity, a base station, the LMF and/or the gNB, among others) and/or an AS-layer message (e.g., via RRC, a MAC CE, and/or UCI, among others), for example);

(2) change to an alternative valid PRS/SRSp configuration (for example, the WTRU may use a second PRS configuration which may be determined to satisfy its validity conditions, when a first PRS configuration is determined to be no longer valid. When there may be multiple PRS configurations which are found to be valid, the WTRU may select the PRS configuration assigned/associated with the highest priority as the second PRS configuration, for example); and/or (3) update and/or transfer validity conditions of a PRS/SRSp configuration (for example, when the WTRU determines that a PRS configuration is no longer valid (e.g., as per the one or more validity conditions), the WTRU may update/transfer its one or more validity conditions, for example based on the validity conditions of another PRS configuration which is determined to be valid. The WTRU may change the first validity conditions (e.g., associated with first PRS configuration) to be similar with or the same as that of the second validity conditions (e.g., associated with second PRS configuration) when the first validity conditions, for example, expire and the second validity conditions are found to be active during expiry of first validity conditions. The WTRU may send information or an indication to the network (e.g., a network entity, a base station, a gNB or the LMF) indicating the update/transfer status of the validity conditions from one PRS configuration to another, for example.

After or upon receiving the PRS configurations and the associated one or more validity conditions, the WTRU may perform PRS measurements using the configurations determined to be valid, when or after receiving and/or detecting a trigger. The trigger may include reception of any of: (i) an LPP message (e.g., a LPP request for location information), (ii) a positioning service request (e.g., a MO-LR, a MT-LR, and/or a deferred MT-LT, among others) and/or an AS-layer message (e.g., via RRC signaling, a MAC CE, and/or DCI), for example.

In certain representative embodiments, the WTRU may determine whether to start using a new PRS configuration before or after a data link HO. A representative procedure for the WTRU to determine whether to start using a new PRS configuration associated with the target gNB/cell before or after the data link HO may be implemented. For example, the representative procedure may avoid any positioning gaps and may be based on one or more PRS configurations and/or one or more positioning mobility configurations. These configurations may include or may indicate or may contain information (e.g., rules/conditions) that indicate when to release/stop an existing PRS configuration and when to start using a new PRS configuration during mobility. For example, the WTRU may receive, from the LMF, one or more PRS configurations (e.g., a first PRS configuration associated with the serving cell and a second PRS configuration associated with the target cell) and a positioning mobility configuration. The WTRU may receive (e.g., from serving gNB) a first RAN configuration (e.g., information including or indicating (i) a measurement gap (MG) configuration (e.g., for making PRS measurements), (ii) a CG configuration (e.g., for sending positioning reports) based on information related to the first PRS configuration provided by the WTRU to the serving base station/gNB. The WTRU may perform PRS measurements using the first PRS configuration and the received RAN configuration when under coverage (e.g., within the coverage area) of the serving cell/gNB/base station. If the positioning mobility configuration indicates to start using the second PRS configuration before the data link HO and the associated condition or conditions are met (e.g., the RSRP of the serving cell is below an RSRP threshold and/or the RSRP of the neighbor cell (e.g., an adjacent cell or a cell in the vicinity of the WTRU) is above the same or a different RSRP threshold), the WTRU may perform any of: (1) determining a second RAN configuration (e.g., a MG configuration or a CG configuration) associated with the second PRS configuration, (2) sending information or an indication to the serving base station/gNB indicating the determined second RAN configuration associated with the second PRS configuration. On condition that information or an indication for using/ activating the second RAN configuration (e.g., the MG configuration or the CG configuration) is received, for example from the serving base station/gNB/cell, the WTRU may: (i) stop and/or release using the first PRS configuration and/or the first RAN configuration, and/or (ii) start performing PRS measurements using the second PRS configuration and/or the second RAN configuration when within the coverage area (e.g., under coverage) of the serving cell.

If the positioning mobility configuration indicates to continue using the first PRS configuration after the data link HO to the target base station/gNB/cell and its associated condition is met (e.g., the RSRP of the neighbor cell is above an RSRP threshold), the WTRU may: (1) determine the second RAN configuration (e.g., the MG configuration or the CG configuration) associated with the second PRS configuration, (2) send information or an indication to the serving base station or gNB indicating the determined second RAN configuration associated with the second PRS configuration and the continued usage of the first RAN configuration (e.g., the MG configuration or the CG configuration) after the data link HO, (3) perform PRS measurements using the first PRS configuration and/or the first RAN configuration during and/or after the HO, (4) if information or an indication for using/activating the second RAN configuration (e.g., the MG configuration or the CG configuration) is received from the target base station/gNB/cell, the WTRU may: (i) stop and/or release the use of the first PRS configuration and/or the first RAN configuration, and/ or (ii) start performing PRS measurements using the second PRS configuration and/or the second RAN configuration when the WTRU is within the coverage area of the target base station/gNB/cell (e.g., when under coverage of the target cell).

The WTRU may send measurement report to the network (e.g., the base station, the gNB, the LMF, and/or a network entity), The measurement report may include information indicating one or more PRS measurements and/or timing/ duration information for starting and/or stopping usage of the first PRS configuration and/or the second PRS configuration.

In certain representative embodiments, the WTRU may dynamically switch between different positioning methods during a HO.

A representative procedure for the WTRU to switch from a first positioning method (e.g., multi-RTT) to a second positioning method (e.g., DL-TDoA) during the HO may be implemented, for example to ensure positioning service continuity. For example, the WTRU may receive configuration information associated with a first positioning method (e.g., a multi-RTT method) and a second positioning method (e.g., a DL-TDoA method) and triggering information indicating one or more triggering conditions/rules for starting/ stopping usage of the second positioning method (e.g., during or after a HO).

The WTRU may perform PRS measurements or a SRSp transmission using the indicated configuration associated with the first positioning method. If a triggering condition for starting the usage of second positioning method is met (e.g., a RSRP of the target/neighbor cell is above an RSRP threshold and/or a HO command is received from the serving base station/gNB), the WTRU may: (1) suspend using the first positioning method, (2) start using the second positioning method (e.g., by perform PRS measurements using the PRS configuration associated with second positioning method), (3) send information or an indication to the network (e.g., the LMF and/or serving base station/gNB) indicating that the triggering condition/rule is met, and/or (4) send a measurement report containing/including measurement information (e.g., which may be provided up to the time when the first positioning method was suspended), among others.

If the triggering condition/rule for stopping the usage of the second positioning method is met (e.g., the RSRP of the source cell/gNB/base station is below an RSRP threshold or the HO complete message is sent to the target cell/gNB/base station), the WTRU may: (1) stop using the second positioning method, (2) resume using the first positioning method and/or (3) send information or an indication to the network (e.g., a network entity, the gNB, the base station and/or the LMF) indicating the triggering condition/rule is met, and/or (3) send the measurement report containing/ including measurements/measurement information (e.g., which may be provided up to the time when first positioning method is resumed), among others.

The WTRU may send a measurement report to the network (e.g., the LMF or another network entity) including information indicating the PRS measurements and/or timing for suspending/resuming of the usage of the first and/or second positioning methods.

In certain representative embodiments, the WTRU may select a PRS configuration to use during mobility based on one or more validity conditions/rules.

A representative procedure for the WTRU to select a PRS configuration to use during mobility (e.g., based on detection of one or more configured area validity conditions (e.g., based on one or more cell IDs) may be implemented. For example, the WTRU may receive one or more PRS configurations and/or one or more area validity conditions indicating a mapping between one or more cell IDs in a validity area and an associated PRS configuration. If one or more cell IDs indicated in the area validity conditions are detected (e.g., the RSRP of a detected cell is above an RSRP threshold during mobility), the WTRU may perform any of: (1) selecting a PRS configuration that matches with at least one of the detected one or more cell IDs, (2) sending information or an indication to the LMF (e.g., a network entity) indicating the detected one or more cell IDs and/or the selected PRS configuration, (3) performing PRS measurements using the selected PRS configuration, and/or (4) sending a measurement report to the network (e.g., the LMF or another network entity) including information indicating the PRS measurements and/or timing for use of the different PRS configurations during mobility (e.g., a mobility event such as a HO and/or a re-establishment procedure), among others.

In certain representative embodiments, the WTRU may send one or more positioning reports to the LMF or other network entity during mobility, for example, based on a reporting configuration.

A representative procedure for the WTRU to send the one or more positioning reports to the LMF (e.g., based on a reporting configuration and/or detection of one or more mobility triggers) may be implemented. For example, the WTRU may receive information indicating one or more PRS configurations and/or one or more reporting configurations (e.g., information containing/including/regarding cell IDs to report and/or a periodicity of reporting). The reporting configurations may be associated with one or more mobility triggers. The WTRU may perform PRS measurements using the received information indicating a PRS configuration. If a mobility trigger is detected (e.g., a neighbor cell ID is detected and/or the WTRU speed increases above a speed threshold), the WTRU may: (1) select a reporting configuration that matches with the mobility trigger, (2) send a positioning report to the LMF or network entity (e.g., based on the selected reporting configuration (e.g., using a reporting periodicity associated with the indicated reporting configuration), and/or (3) send a measurement report to the network (e.g., the LMF or a network entity) including the PRS measurements and/or the timing for use of a different reporting configuration during mobility (e.g., a mobility event).

In certain representative embodiments, the WTRU may use a first PRS configuration associated with a source base station/gNB/cell before and/or during the HO (e.g., data link HO) and may use a second PRS configuration associated with a target gNB/cell after the HO (e.g., the data link HO). For example, the representative procedures may avoid any positioning gaps and may be based on one or more PRS configurations and/or one or more RSRP threshold values associated with PRS measurements. For example, the WTRU may receive, from the network (e.g., the base station, the gNB, the LMF, and/or a network entity), configuration information indicating one or more PRS configurations. The configuration information may indicate, for example any of: (1) a first PRS configuration associated with the source base station/gNB/cell, (2) a second PRS configuration associated with the target base station/gNB/cell; (3) one or more RSRP threshold values of which a first RSRP value and a second RSRP threshold value may be associated with measurements on the PRS resources in the first PRS configuration and/or the second PRS configuration; and/or (4) one or more RRM RSRP threshold values associated with measurements on the RRM resources (e.g., CSI-RS and/or SSB, among others) of the source base station/gNB/cell and/or the target/neighbor base stations/gNBs/cells. The WTRU may receive from the serving base station/gNB/cell (e.g., a source base station/gNB/cell), further information indicating: (1) the configuration and/or (2) an activation indication/information, for example for triggering the usage of a first measurement gap (MG) configuration (e.g., for making measurements on the PRS resources in the first PRS configuration). The WTRU may perform measurements: (1) on the PRS resources in the first PRS configuration and/or (2) using the first MG configuration.

On condition that the RSRP of measurements of the PRS resources in the first PRS configuration is below a first RSRP threshold value and/or the RSRP of measurements of the RRM resources associated with the target base station/gNB/cell is above a first RRM RSRP threshold value, the WTRU may send an indication/information to the serving base station/gNB/cell (e.g., the source base station/gNB/cell) indicating continued usage of a first MG configuration during and/or after the HO (e.g., a data link HO); and may send information associated with the second MG configuration (e.g., for making measurements on the PRS resources in the second PRS configuration, for example after releasing/deactivating the first MG configuration). The WTRU may receive information, from the serving base station/gNB/cell, indicating the usage of the first MG configuration during and/or after the HO (e.g., the data link HO) (e.g., via (1) an acknowledgement message in response to or after the information sent by WTRU and/or (2) an indication message indicating not to release the first MG configuration after receiving a HO command). The WTRU may perform measurements on the PRS resources in the first PRS configuration and/or using the first MG configuration during and/or after the HO (e.g., the data link HO).

On condition that the RSRP of measurements of resources in the first PRS configuration is below a second RSRP threshold value and/or the RSRP of measurements of the RRM resources associated with the target base station/gNB/cell is above a second RRM RSRP threshold value, the WTRU may send information indicating to the serving base station/gNB/cell (e.g., which may be the target base station/gNB/cell) requesting to switch to the second MG configuration. The WTRU may receive information from the serving base station/gNB (e.g., which may be the target base station/gNB/cell) indicating the configuration and/or an activation indication for triggering the usage of the second MG configuration. The WTRU may perform measurements on the PRS resources in the second PRS configuration and/or using the second MG configuration. The WTRU may send one or more measurement reports to the network (e.g., the base station, the gNB, the LMF, and/or a network entity). For example, the measurement reports may include timing information (e.g., a timestamp) indicating when the WTRU switched from using the first PRS configuration to the second PRS configuration.

In certain representative embodiments, methods, procedures, apparatus, and systems may be implemented to switch a WTRU from a first PRS configuration to a second PRS configuration after a HO (e.g., based on a plurality of configured PRS configurations associated with different base stations/gNBs/cells and/or threshold values (e.g., RSRP threshold values)). For example, the WTRU may switch from the first PRS configuration to the second PRS configuration (for example after the HO and/or another mobility event) based on configured PRS configurations that are associated with different base stations, gNBs and/or cells. The switching may be further based on RSRP threshold values.

In various embodiments, the WTRU may use the PRS configuration associated with a previous serving base station/gNB/cell (e.g., the source base station/gNB/cell) during and/or after a data link HO before switching to the second PRS configuration associated with the serving base station/gNB/cell (e.g., the target/neighbor gNB/cell), for example to avoid positioning gaps (e.g., any positioning gaps), based on the configured one or more PRS configurations and the threshold values (e.g., the RSRP threshold values) associated with PRS measurements.

In certain examples, the WTRU may receive from the network (e.g., an LMF, a gNB and/or a base station) one or more of the following:

(1) a plurality of PRS configurations (e.g., a first PRS configuration and a second PRS configuration) (for example, the first PRS configuration may be associated with the first base station, gNB and/or cell, which may be a serving base station, gNB and/or cell (e.g., the source cell) and the second PRS configuration may be associated with the second base station, gNB, and/or cell, which may be a neighbor/non-serving base station, gNB and/or cell (e.g., a target cell)); and/or (2) PRS configuration switching threshold values associated with measurements of signals received from the base station/gNBs/cells/TRPs (for example, the threshold values may correspond to RSRP values, RSSI values and/or RSRQ values, among others), and the signals received from base stations/gNBs/cells/TRPs may correspond to PRS and/or non-PRS signals (e.g., RRM signals, CSI-RS, SSB signals and/or SRS, among others), for example. The PRS configuration switching threshold values may be used by the WTRU for switching from the first PRS configuration to the second PRS configuration when the RSRP value of signals received from base stations/gNBs/cells/TRPs are above/below the RSRP threshold values, for example), among other.

The WTRU may send an indication to the network/cell (e.g., a network entity, for example the LMF, the base station, the gNB, the cell and/or the AMF) to request to configure a measurement gap for performing measurements on PRS resources associated with the first PRS configuration. The WTRU may receive an indication including and/or containing information indicating a first measurement gap configuration, for example from the first base station/gNB/ cell, for example.

The WTRU may perform a first set of one or more measurements on PRSs using the first PRS configuration and the first measurement gap configuration. During mobility, the WTRU may determine whether to: (1) HO, perform cell selection or perform cell reselection from the first base station/gNB/cell to second base station/gNB/cell; and/or (2) switch from first PRS configuration to the second PRS configuration based on the detection of one or more of the following events:

(1) RRM measurements of neighbor cell (e.g., the CSI-RS and/or the SSB of the neighbor cell) being above/below one or more RRM threshold values, for example configured by the network (e.g., a network entity, an LMF, an AMF a gNB, and/or a base station, among others). The RRM measurements/RRM thresholds may be based on RSRP, RSSI and/or RSRQ, among others);

(2) detection of one or more System Information Blocks (SIBs) and/or information related to the SIBs (e.g., a cell ID, a posSIB) associated with the neighbor/target cell, for example when monitoring for a SIB and/or when performing neighbor cell measurements; and/or (3) PRS measurements being above/below one or more threshold values (e.g., using RSRP, RSSI and/or RSRQ, among others), for example when using one or more PRS configurations (for example, the WTRU may determine to HO from the first cell to the second cell and/or switch from a first PRS configuration to a second PRS configuration when the RSRP of the PRSs received from the source cell (e.g., the first cell) is below a first RSRP threshold value and/or above a second RSRP threshold value, where the PRSs received from the source cell may be associated with a first PRS configuration. In another example, the WTRU may determine to HO from the first cell to the second cell and/or switch from a first PRS configuration to a second PRS configuration when the RSRP of the PRSs received from the neighbor/target cell (e.g., the second cell) is above a first RSRP threshold value and/or below a second RSRP threshold value, where the PRSs received from the neighbor/target cell may be associated with a second PRS configuration) among others.

The WTRU may: (1) send an indication to the first base station/gNB/cell, indicating a HO, (2) perform cell selection or reselection from the first station/gNB/cell to the second base station/gNB/cell and/or (3) switch from using a first PRS configuration to a second PRS configuration based on detection of one or more events/triggering conditions (e.g., of the above events/triggering conditions), among others. The WTRU may indicate (e.g., also indicate) to the network (e.g., a network entity, the LMF and/or the serving first base station/gNB/cell) a request to maintain the first PRS configuration and/or to maintain a first measurement gap configuration associated with the first base station/gNB/cell after the HO.

The indication for maintaining the first PRS configuration and/or the first measurement gap configuration may be sent by the WTRU, for example due to one or more of the following: (1) an indication from the network (e.g., the LMF or other network entity) for example, the WTRU may send an indication to request a continuation of the use of the first PRS configuration (e.g., after receiving an indication from the LMF (e.g., after receiving assistance data and/or a configuration) indicating to continue to use the first PRS configuration after the HO (for example when under coverage of the neighbor/target base station/gNB/cell). The WTRU may receive the indication indicating to continue to use the first PRS configuration until the RSRP of the PRS is above/below a RSRP threshold value, for example); and/or (2) PRS measurements (for example, the WTRU may send an indication when the PRS measurements made by WTRU using the first PRS configuration and/or second PRS configuration, are above a first RSRP threshold value and/or below a second RSRP threshold value, for example.

The WTRU may receive a HO request/command from the first base station/gNB/cell to HO to the second base station/ gNB/cell. The WTRU may receive an indication, along with the HO request/command and/or in a separate indication (e.g., an RRC message, and/or a MAC CE, among others) from the first base station/gNB/cell, indicating to maintain the first measurement gap configuration after performing the HO. Upon or after receiving the HO request/command, the WTRU may perform the HO and the second base station/ gNB/cell (e.g., the target cell) may become a serving cell and the first cell may become a non-serving cell after the HO, for example.

The WTRU may perform a second set of measurements on the PRS using the first PRS configuration and the first measurement gap configuration. The WTRU may then perform one or more of the following based on the second set of PRS measurements: (1) on the condition that the second set of PRS measurements is greater than or equal to a PRS configuration switching threshold value, the WTRU may perform a third set of measurements on the PRSs using the first PRS configuration and the first measurement gap configuration; (2) on the condition that the second set of PRS measurements is less than or equal to a PRS configuration switching threshold value, the WTRU may send an indication to the serving base station/gNB/cell to request to configure and/or activate a measurement gap associated with the second PRS configuration. The WTRU may receive information/an indication, from the serving base station/gNB/cell, containing or including configuration information and/or an activation indication for using the second measurement gap configuration. The WTRU may perform a fourth set of measurements on the PRSs using the second PRS configuration and the second measurement gap configuration.

After performing the measurements on the PRSs during the HO, the WTRU may send to the network (e.g., the LMF and/or the serving base station/gNB), the measurement report indicating at least the third set of PRS measurements and/or the fourth set of PRS measurements made by WTRU. The WTRU may send information/an indication indicating which of the PRS configurations used during the HO (e.g., IDs of the first and/or second PRS configurations) and/or the timing information (e.g., a timestamp) indicating when the WTRU switched from using the first PRS configuration to the second PRS configuration, if switching between the different PRS configurations, for example.

Representative Procedures/Methods for Supporting Positioning Service Continuity for UL-Based Positioning In one family of solutions, the WTRU performs positioning service continuity based on transmission of UL-SRSp. For example, the WTRU may perform UL-based positioning by transmitting UL-SRSp during mobility and when undergoing data link HO from a source/serving TRP/gNB/cell to one or more target TRPs/gNBs/cells. The resources used for transmitting the SRSp are allocated to a WTRU by the network (e.g., serving gNB). Typically, one or more neighboring cells/TRPs/gNBs are configured by a network (e.g., an LMF and/or a RAN entity and/or a base station) to receive and make measurements of the SRSp transmitted by a WTRU. When the WTRU undergoes the data link HO from a source gNB to a target gNB, the WTRU may be indicated by a serving gNB to release the resources used for SRSp transmission. The WTRU may then be reconfigured with the same or different SRSp resources by the target gNB after the HO. Additionally, it may be possible that the network may reconfigure one or more existing TRPs/gNBs or add new TRPs/gNBs for receiving the SRSp transmitted by the WTRU based on WTRU mobility and/or HO, such that the location of the WTRU may be determined with high accuracy.

In another family of solutions, the WTRU may send positioning related reports to a network for updating TRP/gNBs that can receive UL-SRSp transmitted by the WTRU. For example, a WTRU may be configured to determine and send a positioning related report to a network on whether the one or more target/neighbour cells are able to receive the SRSp transmitted by the WTRU during WTRU mobility. In this case, the WTRU may be configured with a mapping between the SRSp and the group comprising one or more target TRP/cells (e.g., cell IDs) which are configured to receive the SRSp transmitted by the WTRU. Since the WTRU may also be configured to make RRM measurements, possibly for facilitating a data link HO, the WTRU may determine/detect the target/neighbouring cell based on the RRM measurements and identify the corresponding cell IDs. The WTRU may then report to the serving cell upon determining whether the target cells are within the existing mapping between the SRSp configured in the WTRU and a list of cells that can measure the SRSp. For example, the WTRU may report to the serving cell (e.g., in RRC signaling, UL MAC CE, and/or UCI) indicating the one or more detected target cell IDs which is not present in the mapping showing the association between the SRSp and the target cell list configured in the WTRU. Based on the report sent by the WTRU, the network may possibly configure the new target cell for receiving and measuring the SRSp. The WTRU may receive an updated mapping, possibly containing the new target cells in the cell list. The WTRU may also receive a new/updated SRSp configuration for support during mobility, for example.

For minimizing the latency associated with configuring the new target cells for receiving the SRSp transmitted by the WTRU, the WTRU may be configured with one or more positioning service continuity conditions which the WTRU can monitor and report to the network when triggered by the conditions. For example, the WTRU may be configured with UL-based positioning measurements thresholds, such that RSRP measurements made on SSB, CSI-RS, and/or PRS transmitted by a target cell may exceed a threshold value and/or remain above the threshold for a time duration. The measurement thresholds configured for UL-based positioning may be lower than or equal to the thresholds configured for RRM measurements associated with the data link HO. Alternatively or additionally, the WTRU may be configured with a service continuity condition relating to detection of a new target cell ID, in which case the WTRU may detect a new target cell ID (e.g., in SIB/SSB) during mobility or when a blockage clears between the WTRU and the target cell. Alternatively or additionally, the WTRU may be configured with a service continuity condition relating to WTRU mobility attributes, such as change in WTRU speed, direction, orientation, etc. by a predetermined or dynamically determined threshold.

The WTRU may indicate information related to the positioning service continuity conditions (e.g., the target cell ID, measurements) when reporting to the network. Transmission of the reports upon triggering of positioning service continuity conditions in advance may enable the network to perform reconfiguration of the target TRPs/gNBs/cell with low latency and/or before the WTRU undergoes the HO.

In another solution, a WTRU, configured with a mapping between SRSp and the associated TRPs/gNBs/cells that may receive the SRSp transmitted by WTRU, may send a request to the serving gNB to change the existing SRSp configuration. In this case, the WTRU may send the request to a serving gNB for changing/updating the SRSp when detecting one or more configured positioning service continuity conditions described above, for example. The WTRU may then receive the updated/new SRSp configuration from the serving gNB. The new/updated SRSp configuration may be received by the WTRU possibly when receiving the signaling associated with the data link HO (e.g., a RRCReconfiguration message and/or a HO command), for example.

In another family of solutions, a WTRU may be configured with SRSp usage rules for using SRSp configurations. For example, the WTRU may be (pre)configured with one or more resources/resource sets associated with SRSp configurations along with SRSp usage rules indicating the triggering and validity for when and how to start/stop using an SRSp configuration. In such a case, the WTRU may receive the SRSp configurations and/or the SRSp usage conditions from RAN. Alternatively or additionally, the WTRU may receive the SRSp configuration from RAN and at least a part of the SRSp usage rules from the LMF. The SRSp usage rules received by the WTRU may be associated with at least one SRSp configuration. The SRSp usage rules may indicate starting/stopping the transmission of an associated SRSp configuration (e.g., an ID of the SRSp configuration) when triggered by various conditions.

An example condition for starting/stopping the transmission of an associated SRSp configuration includes detection of a target/neighbour cell ID. For example, the configured rules may indicate using a first SRSp configuration when detecting a target cell ID (e.g., in SIB/SSB) which is within a group of TRPs/gNBs associated with the first SRSp configuration. A similar rule may apply for using a second SRSp configuration, for example.

Another example condition for starting/stopping the transmission of an associated SRSp configuration includes RRM/PRS measurements of one or more target TRPs/gNBs. For example, the configured rules may indicate using a first SRSp configuration when the measured RSRP value (e.g., over received SSB and/or PRS) is above/below a first threshold and using a second SRSp configuration when the measured RSRP value is above/below a second threshold.

Another example condition for starting/stopping the transmission of an associated SRSp configuration includes a validity area. For example, the one or more SRSp configurations preconfigured in a WTRU may be associated with a validity area consisting of a group of one or more TRPs/gNBs. In this case, the WTRU may use a first SRSp configuration so long as the WTRU is mobile or undergoes the HO from a source to a target cell within the validity area (e.g., one or more the target TRP/gNB/cells ID detected by WTRU or undergoes the data link HO is within the validity area group). Based on the configured rules, the WTRU may stop using a first SRSp configuration and start using a second SRSp configuration when detecting a different TRP/gNB during mobility.

Another example condition for starting/stopping the transmission of an associated SRSp configuration includes a validity time. For example, the one or more SRSp configurations may be associated with a validity time duration. The WTRU may start/stop using an SRSp configuration based on setting/expiry of a timer over the configured validity time duration.

Another example condition for starting/stopping the transmission of an associated SRSp configuration includes one or more WTRU mobility attributes. For example, the configured rules may indicate using a first SRSp configuration when the WTRU speed is within a first range (e.g., upper and lower threshold speed values). The rules may also indicate using a second SRSp configuration when the WTRU speed is within a second range.

In the case when one or more of the triggering conditions are not met (e.g., the WTRU detects a new target cell ID which is outside of one of the TRP/gNB groups and associated SRSp configured in the WTRU, the WTRU may send an indication to the network to request for a new SRSp configuration and/or new SRSp usage rules, for example.

In another family of solutions, a WTRU may receive an SRSp configuration associated with a target gNB via the serving gNB before/during the HO. For example, the WTRU may be configured by the source gNB with the SRSp configuration, which may be determined based on coordination with a target gNB, during WTRU mobility. In an example, a WTRU may be configured with SRSp for UL-based positioning by the source/serving gNB. When the WTRU undergoes a potential data link HO to a target gNB, the source gNB may ensure support for positioning service continuity, where the WTRU may continue transmitting SRSp before and/or during the HO without interruption.

The WTRU may indicate to a network the support for positioning service continuity and possibly based on the indication, the serving gNB may determine the suitable resources and SRSp configuration to be allocated to the WTRU. The WTRU may send the indication for supporting positioning service continuity either in a separate message (e.g., in RRC signaling, UL MAC CE, and/or UCI) or along with the RRM measurement for facilitating the data link HO.

The serving gNB may identify the target gNB based on the WTRU indication/report and coordinate with the target gNB (e.g., via the HO signaling in over Xn) for determining the SRSp configuration to be provided to the WTRU.

In this case, the WTRU, which may be configured with a first SRSp configuration, may receive a second SRSp configuration to be used during and after the data link HO. The second SRSp configuration may be associated with the resources allocated by the target gNB, which may be indicated to the serving gNB during a HO procedure, for example. The WTRU may receive the second SRSp configuration before or along with the RRCReconfiguration message containing the HO command. The WTRU may also receive one or more conditions associated with when to start/stop using the second SRSp configuration. For example, the WTRU may start using the second SRSp configuration upon receiving the HO command from the serving cell and/or releasing the first SRSp configuration. The WTRU may stop using the second SRSp configuration upon receiving a RRC reconfiguration indication from the target gNB, which may be received after the HO and/or after establishing connectivity with the target gNB, for example.

In another example, the WTRU may use a first SRSp configuration prior to the HO to the target gNB (e.g., before and/or after receiving the HO command) and start using the second SRSp configuration immediately upon the HO (e.g., after sending the RACH and/or RRC signaling for connectivity establishment with the target gNB). The reception of the SRSp configuration before undergoing the data link HO may enable the WTRU to support positioning service continuity for UL-based positioning with low latency, for example.

In another family of solutions, a WTRU may assist a RAN in performing the data link HO based on transmission of SRSp. For example, the WTRU may assist in performing the data link HO from a source cell to a target cell based on selection of a suitable SRSp configuration and transmission of the selected SRSp. The WTRU may be (pre)configured with one or more SRSp configurations for supporting UL-based positioning. The WTRU may also be configured with one or more rules indicating when to start/stop using the SRSp (pre)configurations. In this case, the rules may indicate using a first SRSp configuration up to a detection of a target gNB/cell ID (e.g., via RRM measurements, or neighbor cell SIB) and then using a second SRSp configuration. Reception of the SRSp (e.g., using the second SRSp configuration) at the serving gNB and/or the target gNB may trigger the data link HO procedure.

In another example, the WTRU may select an SRSp configuration from the set of (pre)configurations based on an indication from the network indicating the support of conditional HO (CHO). In this case, the WTRU may select an SRSp configuration which may have a different Tx power level (e.g., higher than the existing SRSp which is intended for conventional HO) such that the SRSp may be received by multiple TRPs/gNBs with better RSRP. The RAN may then identify the potential target gNBs for CHO by determining the subset of target gNBs that may receive the SRSp transmitted by the WTRU above a certain RSRP threshold, for example. The WTRU may then receive the conditions associated with the CHO procedure from the serving gNB, which may be used by the WTRU for evaluation and/or determining the target gNB for HO, for example.

In certain representative embodiments, the WTRU may determine a SRSp configuration to use during mobility (e.g., based on detection of configured mobility triggers).

A representative procedure for the WTRU to determine the SRSp configuration to use for the UL positioning during mobility (e.g., based on detection of configured mobility triggers) may be implemented. For example, the WTRU may send information or an indication to the serving base station/gNB (e.g., to indicate capabilities/capability information of the WTRU for the support of positioning service continuity during mobility.

The WTRU may receive any of: (1) one or more SRSp configurations, (2) one or more validity conditions associated with the SRSp configurations (e.g., a RAN notification area and/or a TA timer/timing information, among others) and/or (3) one or more SRSp usage rules indicating when to start and/or stop using the SRSp configurations (e.g., based on detection of mobility triggers) (for example one or more RSRP measurements of neighbor cells that are above an RSRP threshold and/or a reception of an HO command).

If a mobility trigger is detected, the WTRU may: (1) select an SRSp configuration which meets the one or more validity conditions, and/or (2) send information or an indication to the serving base station/gNB indicating the selected SRPp configuration. The WTRU may perform a SRSp transmission using the selected SRSp configuration based on SRSp usage rule, for example after or upon receiving information or an indication from the gNB, the base station and/or the network entity indicating the activation of the SRSp configuration.

Representative Procedures/Methods for Supporting Positioning Service Continuity Based on Switching Between Different Positioning Methods In certain representative embodiments, the WTRU may support positioning service continuity procedures with LPP. For example, the WTRU may receive one or more RAN configurations associated with positioning to be applied during mobility. The WTRU may use one or more validity conditions to determine the PRS configurations to apply during mobility.

In certain representative embodiments, the WTRU may determine whether to start using a new PRS configuration before or after a data link HO.

In certain representative embodiments, the WTRU may dynamically switch between different positioning methods during the HO.

In certain representative embodiments, the WTRU may select a PRS configuration to use during mobility based on validity conditions.

In certain representative embodiments, the WTRU may send one or more positioning reports to the LMF or other network entity during mobility based on a reporting configuration.

In certain representative embodiments, the WTRU may determine the SRSp configuration to use during mobility based on detection of configured mobility triggers.

FIG. 5 is a graphical illustration depicting timing of operations before, during, and after HO according to an embodiment.

Referring to FIG. 5, a WTRU may switch to a different positioning method during the HO for ensuring positioning service continuity. For example, the WTRU may switch from a first positioning method at 500A to a second positioning method at 502 for the duration 504 of the data link HO, possibly switching back to the first positioning method at 500B after the HO. In such a case, the WTRU may be configured to perform DL&UL-based positioning methods (e.g., multi-RTT) by the serving gNB. In the case of this multi-RTT positioning method, the WTRU may perform measurements on the received DL-PRS over a first duration from a group of TRPs/gNBs and transmit UL-SRSp over a second duration to the group of TRPs/gNB. The positioning information of the WTRU may be determined based on the RTT taken for the PRS and SRSp to traverse between the network nodes and WTRU, for example.

For supporting positioning service continuity, where the positioning related measurements may be supported when undergoing the data link HO, the WTRU may be configured with at least a second positioning method in addition to the first positioning method. In the case when the WTRU is configured with multi-RTT as the first positioning method, the WTRU may also be configured by a network with DL-based (DL-PRS) or UL-based (UL-SRSp) as a second positioning method performed at 504, for example. The WTRU may also be configured with one or more positioning service continuity conditions, as described above, for determining when to switch from the first method to the second method. In an example, the WTRU, which may be configured to perform multi-RTT positioning by measuring DL-PRS and transmitting UL-SRSp before detecting positioning service continuity conditions (e.g., reception of RRCReconfiguration message/HO Command), and may switch to performing measuring (e.g., only measuring) of DL-PRS in the duration of the HO. The WTRU may switch back to performing multi-RTT upon establishing connectivity with a target gNB (e.g., upon performing RRC signaling transmission/reception).

The switching from the first positioning method at 500A to a second positioning method at 504 temporarily during the HO may allow achievement of graceful degradation in positioning accuracy and reliability performance, for example. When switching from one positioning method to another, the WTRU may send an indication to the network (the LMF and/or the RAN) in RRC signaling, MAC CE, and/or UCI. The WTRU may send an indication indicating the switching to another positioning method along with the signaling associated with the data link HO (e.g., RRC signaling containing measurement report, RACH message), for example. The WTRU may be configured to use and switch between one or more different second positioning methods during the HO where the different positioning methods used by the WTRU may be correlated/aligned with the signaling associated with the data link HO, for example.

In an example, the WTRU may be configured to use the DL-TDoA positioning method prior to HO and, during HO, the WTRU may switch to using the multi-RTT method. Upon completion of HO, the WTRU may switch back to using DL-TDoA. Achieving a certain accuracy in positioning with the use of DL-ToA may require timing synchronization between the WTRU and TRPs/gNBs. Since, during the HO, there may be a certain duration in which the WTRU may lose synchronization with a serving gNB and/or may not be synchronized with the target gNB, the WTRU may use positioning methods which may have less stringent synchronization requirements with a network such as multi-RTT or DL-AoD methods during the HO, for example. In this case, the second positioning method with relaxed synchronization may be used in the associated duration where the WTRU may not be synchronized with the network and/or based on synchronization related triggers. The WTRU may then switch to using the DL-TDoA method upon establishing synchronization with the target gNB, for example.

In another example, the switching point may be determined by the WTRU with/without network assistance based on monitoring of WTRU mobility attributes and/or WTRU radio environment. For example, when the WTRU detects an increase in delay while measuring DL-PRS or drop in positioning measurement accuracy (e.g., RSRP of PRS is below a threshold), possibly due to increase in WTRU speed, the WTRU may switch to performing transmission of UL-SRSp for a certain duration while performing the HO. The WTRU may then switch back to measuring DL-PRS, possibly upon sending a switching indication to the network after the HO.

In the case of using the multi-RTT method, which includes both the DL-based and UL-based methods, the WTRU may be (pre)configured with DL-PRS configuration and UL-SRSp configurations and both configurations may be activated prior to the HO. When the WTRU undergoes the HO, one of the methods/configurations may be deactivated for the duration of the HO and then activated upon completion of the HO. The signaling associated to activating/deactivating the one or more positioning methods may be received by the WTRU from the network in RRC signaling, MAC CE, and/or DCI. In the case when the WTRU determines the activation/deactivation of the positioning methods based on detection of one or more positioning service continuity conditions, the WTRU may send the activation/deactivation indications to the network in RRC signaling, MAC CE, and/or UCI, for example.

Representative Procedures/Methods, Implemented in a WTRU, of Supporting Positioning Service Continuity FIG. 6 is a flow diagram illustrating a representative method implemented by a WTRU.

Referring to FIG. 6, the representative method 600 implemented in a WTRU 102, 200, 300 400 and 500 may support positioning service continuity. At block 610, the WTRU 102 may receive configuration information indicating a configuration for supporting positioning service continuity during a HO. For example, and as further detailed herein, the WTRU 102, 200, 300 400 and 500 may receive a configuration for performing support of positioning service continuity for DL positioning and/or for UL positioning. Alternatively, or additionally, the WTRU 102, 200, 300 400 and 500 may receive information/a configuration for switching between positioning methods before and/or during a data link HO. The operation may proceed from block 610 to block 620.

At block 620, the WTRU 102, 200, 300 400 and 500 may support positioning service continuity according to the configuration at least in part by determining one or more transmissions to be performed. For example, the WTRU 102, 200, 300 400 and 500 may use a new PRS configuration associated with a target gNB/base station when under the coverage of and/or connected to a source gNB/base station, as previously described with reference to FIG. 2. Alternatively, or additionally, the WTRU 102, 200, 300 400 and 500 may use an existing PRS configuration associated with a source gNB/base station when under the coverage of and/or connected to a target gNB/base station, as previously described with reference to FIG. 3. Alternatively, or additionally, the WTRU 102, 200, 300 400 and 500 may use an existing PRS configuration associated with a source gNB/base station and a new PRS configuration associated with a target gNB/base station during data link HO as previously described with reference to FIG. 4. Alternatively, or additionally, the WTRU 102, 200, 300 400 and 500 may use a first positioning method before the data link HO and switch to a second positioning method during the data link HO as previously described with reference to FIG. 5. The operation may proceed from block 620 to block 630.

At block 630, the WTRU 102, 200, 300 400 and 500 may assist a radio access network with a data link HO by performing the one or more transmissions according to the configuration. For example, in supporting positioning service continuity for DL positioning, the WTRU 102, 200, 300 400 and 500 may send information on positioning measurements to a radio access network for assisting with the data link HO. Alternatively, or additionally, in supporting positioning service continuity for DL positioning, the WTRU 102, 200, 300 400 and 500 may perform transmission of UL-SRSp.

In some implementations, the WTRU 102, 200, 300 400 and 500 supports positioning service continuity for DL positioning and the configuration is at least one PRS configuration. In these implementations, the method 600 may include various operations or steps specific to these implementations. For example, the method may include performing the positioning service continuity based on PRS/RRM measurements and/or sending a request for a new PRS configuration message to a serving gNB/base station. Alternatively, or additionally, the method may include sending a positioning service continuity report and/or receiving an at least one of new or updated PRS configuration in response to the positioning service continuity report. Alternatively, or additionally, the method may include using a PRS configuration of a target gNB before a data link HO in a coverage area of a source gNB/base station, using a PRS configuration of the source gNB/base station after the data link HO in a coverage area of the target gNB/base station, and/or using the PRS configuration of the source gNB/base station and the PRS configuration of the target gNB/base station during the data link HO. Alternatively, or additionally, the method may include determining usage of two or more PRS configurations, including at least the PRS configuration of the source gNB/base station and the PRS configuration of the target gNB/base station, based on a measurement gap configuration, and/or sending information on positioning measurements to the radio access network for assisting with the data link HO.

In some implementations, the WTRU 102, 200, 300 400 and 500 supports positioning service continuity for UL positioning and the configuration includes one or more SRSp configurations and SRSp usage rules for using the one or more SRSp configurations. In these implementations, the method 600 may include various operations or steps specific to these implementations. For example, the method may include performing the positioning service continuity based on transmission of UL-SRSp and/or sending positioning related reports to the radio access network for updating TRP/gNBs that can receive the UL-SRSp transmitted by the WTRU 102, 200, 300 400 and 500. Alternatively, or additionally, the method may include receiving an SRSp configuration associated with a target gNB/base station via a serving gNB/base station at least one of before or during a data link HO. Alternatively or additionally, the method may include assisting the radio access network in performing the data link HO based on transmission of the UL-SRSp.

In some embodiments, the WTRU 102, 200, 300, 400 and 500 may use a first positioning method before the data link handover and may switch to a second positioning method during the data link handover.

FIG. 7 is a flow diagram illustrating another representative method implemented by a WTRU.

Referring to FIG. 7, the representative method 700 may include, at block 710, the WTRU 102, 200, 300 400 and 500 receiving information indicating: (1) a first Positioning Reference Signal (PRS) configuration associated with a first cell, (2) a second PRS configuration associated with a second cell, and (3) a measurement gap (MG) configuration. At block 720, the WTRU 102, 200, 300 400 and 500 may perform first PRS measurements on a first transmission from the first cell using the first PRS configuration and the MG configuration. At block 730, the WTRU 102, 200, 300 400 and 500 may send, to a first Network Entity (NE) associated with the first cell, a request including information indicating to maintain, after a mobility event (ME) associated with the second cell is performed, the MG configuration. At block 740, the WTRU 102, 200, 300 400 and 500 may receive information indicating: (1) to perform the ME associated with the second cell, and (2) to maintain, after the ME is performed, the MG configuration. At block 750, the WTRU 102, 200, 300 400 and 500 may perform, after the ME is performed, second PRS measurements on the first transmission or a further transmission from the first cell using the first PRS configuration and the MG configuration. At block 760, the WTRU 102, 200, 300 400 and 500 may send, to a second NE associated with the first cell, information indicating the second PRS measurements.

For example, the WTRU 102, 200, 300, 400 and 500 may receive (e.g., from a base station, LMF and/or NE): (1) a first PRS configuration; (2) a second PRS configuration (e.g., for which the first PRS configuration may be associated with a first cell (e.g. a source cell) and the second PRS configuration may be associated with a second cell (e.g., a target cell)); (3) a PRS switching threshold, and (4) one or more Reference Signal Received Power (RSRP) threshold values (e.g., first and second RSRP threshold values). The WTRU 102, 200, 300, 400 and 500 may perform first PRS measurements (e.g., of PRS from the first cell) using the first PRS configuration and a first MG configuration (received from the first cell).

The WTRU 102, 200, 300, 400 and 500 may send a request to the first cell for maintaining the first MG configuration after a HO when the first PRS measurement or measurements meet an RSRP threshold criteria (e.g., when a PRS measurement is higher than a first threshold and/or lower than a second threshold).

The WTRU 102, 200, 300, 400 and 500 may receive a HO indication from the first cell indicating to HO to the second cell and an indication to maintain the first MG configuration during and/or after the HO.

The WTRU 102, 200, 300, 400 and 500 may perform second PRS measurements, after the HO to the second cell. The second PRS measurements may be performed/done using the first PRS configuration and the first MG configuration of the first cell.

The WTRU 102, 200, 300, 400 and 500 may determine whether the second PRS measurement satisfies (e.g., is less than) a PRS switching threshold. If the PRS switching threshold is not satisfied, the WTRU 102, 200, 300, 400 and 500 may send a report (e.g., to the LMF). The report may include the second PRS measurements and/or an indication of a first PRS configuration identifier (ID) used during the HO. If the PRS switching threshold is satisfied, the WTRU 102, 200, 300, 400 and 500 may any of: (1) send a request to the second cell for a second MG gap configuration associated with the second PRS configuration; (2) receive information indicating the second MG configuration; (3)

perform third PRS measurements using the second PRS configuration and the second MG configuration; (4) send a report (e.g., to the LMF) including the second PRS measurements, the third PRS measurements and/or an indication of the second PRS configuration ID and a time (e.g., a timestamp) indicating the time when the WTRU switched from the first PRS configuration to the second PRS configuration.

In certain representative embodiments, the WTRU 102, 200, 300, 400 and 500 may determine to send the request to the first cell indicating to maintain, after the ME is performed, the MG configuration.

In certain embodiments, the first NE associated with the first cell and the second NE associated with the first cell may be one base station or the first NE may be a first base station and the second NE may be a Location Management Function (LMF) entity.

In certain representative embodiments, the WTRU 102, 200, 300, 400 and 500 may, on condition that the second PRS measurements do not satisfy a PRS ME threshold, any of: (1) send, to a first NE associated with the second cell, a request for a further MG configuration; (2) receive information indicating the further MG configuration; (3) perform third PRS measurements on a transmission from the second cell using the second PRS configuration and the further MG configuration; and/or (4) send, to a second NE associated with the second cell, further information indicating any of: (1) the third PRS measurements, (2) the second PRS configuration, and/or (3) a time when the WTRU started to use the second PRS configuration.

In some embodiments, the first NE associated with the first cell and the second NE associated with the first cell may be a single base station or the first NE associated with the first cell may be a first base station and the second NE associated with the first cell may be a LMF entity. The first NE associated with the second cell and the second NE associated with the second cell may be another single base station or the first NE associated with the second cell may be the second base station and the second NE associated with the second cell may be the LMF entity.

In certain representative embodiments, the ME may be any of: (1) a hand over; or (2) a reselection, and the WTRU 102, 200, 300 400 and 500 may perform the handover or the reselection of the WTRU 102, 200, 300 400 and 500 to the second cell.

In some embodiments, the further information may be included in a positioning service continuity report. The WTRU 102, 200, 300 400 and 500 may receive a new PRS configuration or an updated PRS configuration in response to or after the positioning service continuity report. The new PRS configuration or the updated PRS configuration may be associated with a target NE or the first NE associated with the second cell.

In certain representative embodiments, the performance of second PRS measurements on the first transmission or the further transmission from the first cell, after the ME is performed, using the first PRS configuration and the MG configuration may include the WTRU 102, 200, 300 400 and 500 performing the first PRS measurements on the first transmission from the first cell using the first PRS configuration associated with the first cell after a data link handover in a coverage area of the second cell.

In certain representative embodiments, the WTRU 102, 200, 300, 400 and 500 may perform, before the ME is performed, further PRS measurements on a transmission from the second cell using the second PRS configuration associated with the second cell in a coverage area of the first cell.

In certain representative embodiments, the WTRU 102, 200, 300, 400 and 500 may perform, during the ME, further PRS measurements: (1) on the transmission from the first cell using the first PRS configuration of the first cell and (2) on a transmission from the second cell using the second PRS configuration of the second cell.

In certain representative embodiments, the WTRU 102, 200, 300, 400 and 500 may switch, during the ME, from a first positioning method to a second positioning method.

In certain representative embodiments, the WTRU 102, 200, 300, 400 and 500 may receive information indicating to use, activate or deactivate one or more of the PRS configurations.

In certain representative embodiments, the WTRU 102, 200, 300, 400 and 500 may trigger the performance of the second PRS measurements in response to or after the ME. For example, the performance of: (1) the first PRS measurements may use the first PRS configuration and the MG configuration before the ME is performed and/or (2)) the second PRS measurements may use the first PRS configuration and the MG configuration during at least a first part of the ME. The WTRU 102, 200, 300 400 and 500 may perform further PRS measurements using the second PRS configuration and the second MG configuration (1) during at least a second part of the ME and/or (2) after the ME is performed.

In certain representative embodiments, the WTRU 102, 200, 300, 400 and 500 may any of: (1) receive information associated with: (i) a first positioning operation, (ii) a second positioning operation and/or (iii) one or more trigger conditions for starting and/or stopping usage of the second positioning operation; and/or (2) on condition that the one or more trigger conditions are satisfied to start using the second positioning operation, initiate use of the second positioning operation. For example, the performance of: (1) the first PRS measurements may use the first PRS configuration associated with the first positioning operation, and/or (2) the second PRS measurements may use the second PRS configuration associated with the second positioning operation.

In certain representative embodiments, the WTRU 102, 200, 300, 400 and 500 may trigger the performance of the second PRS measurements using the second PRS configuration associated with the second positioning operation in response to or after the ME. For example, the performance of: (1) the first PRS measurements may use the first PRS configuration: (i) before the ME is performed and/or (ii) during at least a first part of the ME and/or (2) the second PRS measurements may use the second PRS configuration (i) during at least a second part of the ME and/or (ii) after the ME is performed.

In certain representative embodiments, the WTRU 102, 200, 300, 400 and 500 may receive reporting configuration information indicating a plurality of reporting configurations. For example, each indicated reporting configuration may be associated with a type of trigger condition associated with the ME. The WTRU 102, 200, 300, 400 and 500 may send, to a LMF Entity, a positioning report in accordance with the type of trigger condition associated with the ME. For example, the type of trigger condition associated with the ME may include any of: (1) a speed-related trigger condition associated with the WTRU 102, 200, 300, 400 and 500; (2) a velocity-related trigger condition associated with the WTRU; (3) a direction of movement-related trigger condition associated with the WTRU 102, 200, 300, 400 and 500; (4) an orientation-related trigger condition associated with the WTRU 102, 200, 300, 400 and 500; (5) an environment-related trigger condition associated with the WTRU 102, 200, 300, 400 and 500; (6) an indoor/outdoor status-related trigger condition associated with the WTRU 102, 200, 300, 400 and 500; and/or (7) a neighbouring cell detection/discover-related trigger condition.

In certain representative embodiments, a first reporting configuration of the indicated plurality of reporting configurations may include first periodicity information and a second reporting configuration of the indicated plurality of reporting configurations may include second, different periodicity information.

FIG. 8 is a flow diagram illustrating a further representative method implemented by a WTRU.

Referring to FIG. 8, the representative method 800 may include, at block 810, the WTRU 102, 200, 300 400 and 500 receiving information indicating: (1) a first Positioning Reference Signal (PRS) configuration associated with a first cell, (2) a second PRS configuration associated with a second cell, and (3) a first measurement gap (MG) configuration associated with the first cell. At block 820, the WTRU 102, 200, 300, 400 and 500 may perform, before a handover (HO), first PRS measurements on a first transmission from the first cell using the first PRS configuration and the indicated first MG configuration. At block 830, the WTRU 102, 200, 300, 400 and 500 may, on condition that the HO occurred, determine whether to use the indicated first MG configuration or a further MG configuration associated with the second cell. At block 840, the WTRU 102, 200, 300, 400 and 500 may, on condition that the further MG configuration is to be used, send, to a first network entity (NE) associated with the second cell, a request for the further MG configuration. At block 850, the WTRU 102, 200, 300, 400 and 500 may receive information indicating the further MG configuration. At block 860, the WTRU 102, 200, 300, 400 and 500 may perform, after the HO, second PRS measurements on a transmission from the second cell using the second PRS configuration and the further MG configuration. At block 870, the WTRU 102, 200, 300, 400 and 500 may send to a second NE associated with the second cell, information indicating any of: (1) the second PRS measurements, (2) the second PRS configuration, and/or (3) a time (e.g., timestamp) when the WTRU started to use the second PRS configuration.

In certain representative embodiments, the determination of whether to use the indicated first MG configuration associated with the first cell or a further MG configuration associated with the second cell may include a determination whether the first PRS measurements satisfy a PRS ME threshold.

In certain representative embodiments, the information sent to the second NE associated with the second cell may be included in a positioning service continuity report. In certain representative embodiments, the WTRU 102, 200, 300, 400 and 500 may receive a new PRS configuration or an updated PRS configuration in response to or after the positioning service continuity report. For example, the new PRS configuration or the updated PRS configuration may be associated with a target NE or the first NE associated with the second cell.

In certain representative embodiments, (1) the first NE associated with the first cell and the second NE associated with the first cell may be a single base station, or (2) the first NE associated with the first cell may be a first base station and the second NE associated with the first cell may be a LMF entity.

In some embodiments, (1) the first NE associated with the second cell and the second NE associated with the second cell may be another single base station, or (2) the first NE associated with the second cell may be a second base station and the second NE associated with the second cell may be the LMF entity.

FIG. 9 is a flow diagram illustrating an additional representative method implemented by a WTRU.

Referring to FIG. 9, the representative method 900 may include, at block 910, the WTRU 102, 200, 300 400 and 500 receiving information indicating: (1) a Positioning Reference Signal (PRS) configuration associated with a first cell and (2) a measurement gap (MG) configuration. At block 920, the WTRU 102, 200, 300 400 and 500 may receive information indicating a mobility event (ME) associated with a second cell is to be performed. At block 930, the WTRU 102, 200, 300 400 and 500 may perform first PRS measurements on one or more transmissions from the first cell using the PRS configuration and the MG configuration. For example, the performing of the PRS measurements may occur before and after the indicated ME is performed.

In certain representative embodiments, the WTRU 102, 200, 300, 400 and 500 may any of: (1) send a request to the first cell including preference information indicating to maintain the MG configuration, after the ME associated with the second cell is performed; and/or (2) receive confirmation information indicating a confirmation that: (i) the ME associated with the second cell is to be performed, and (ii) to maintain the MG configuration after the ME is performed.

In certain representative embodiments, the WTRU 102, 200, 300, 400 and 500 may any of: (1) perform second PRS measurements on the first transmission or a further transmission from the first cell, after the ME is performed, using the first PRS configuration and the MG configuration; and/or (2) send, to a network entity (NE) of the second cell, information indicating the second PRS measurements.

FIG. 10 is a flow diagram illustrating still another representative method implemented by a WTRU.

Referring to FIG. 10, the representative method 1000 may include, at block 1010, the WTRU 102, 200, 300 400 and 500 receiving configuration information indicating: (1) one or more sounding reference signal for positioning (SRSp) configurations and (2) one or more validity conditions. At block 1020, the WTRU 102, 200, 300 400 and 500 may, on condition that one or more indicated validity conditions associated with an indicated SRSp configuration are satisfied, select the indicated SRSp configuration. At block 1030, the WTRU 102, 200, 300 400 and 500 may send, to a network entity (NE), an uplink transmission including one or more SRSp in accordance with the selected SRSp configuration.

In certain representative embodiments, the WTRU 102, 200, 300, 400 and 500 may receive, from the NE, positioning information associated with the WTRU 102, 200, 300 400 and 500. For example, the positioning information may be derived in accordance with SRSp measurements of the uplink transmission.

In certain representative embodiments, each SRSp configuration may be associated with a set of indicated validity conditions including any of: (1) one or more area-related conditions; (2) one or more time-related conditions and/or (3) one or more mobility-related attribute conditions. For example, the one or more area-related conditions may include any of: (1) a detected cell identifier associated with a coverage area of a cell for serving the WTRU 102, 200, 300 400 and 500 corresponds to a cell identifier associated with a respective SRSp configuration; (2) a detected Radio Access Network (RAN) notification area of the WTRU 102, 200, 300 400 and 500 corresponds to a RAN notification area associated with the respective SRSp configuration; (3) a detected geographic area of the WTRU 102, 200, 300 400 and 500 corresponds to a geographic area associated with the respective SRSp configuration; (4) a determined area identifier of the WTRU 102, 200, 300 400 and 500 corresponds to an area identifier associated with the respective SRSp. The detected cell identifier may correspond to a cell identifier associated with the respective SRSp configuration.

As a second example, the one or more time-related conditions may include any of: (1) a time during a time period after a trigger condition is satisfied; (2) a time (e.g., timestamp) after a time period ends from when the trigger condition is satisfied; and/or (3) a time during a time window after the trigger condition is satisfied.

As a third example, the one or more mobility-related attribute conditions may include any of: (1) a detected speed or velocity of the WTRU 102, 200, 300 400 and 500 satisfies a speed or velocity condition associated with a respective SRSp configuration; (2) a determined speed change or velocity change of the WTRU 102, 200, 300 400 and 500 satisfies a speed change or velocity change condition associated with the respective SRSp configuration; (3) an expected speed or velocity of the WTRU 102, 200, 300 400 and 500 satisfies the speed or velocity condition associated with the respective SRSp configuration; (4) an expected speed change or velocity change of the WTRU 102, 200, 300 400 and 500 satisfies the speed change or velocity change condition associated with the respective SRSp configuration; (5) a detected direction of movement of the WTRU 102, 200, 300 400 and 500 satisfies a direction of movement condition associated with the respective SRSp configuration; (6) an expected direction of movement of the WTRU 102, 200, 300 400 and 500 satisfies the direction of movement condition associated with the respective SRSp configuration; (7) a detected orientation of the WTRU 102, 200, 300 400 and 500 satisfies an orientation condition associated with the respective SRSp configuration; (8) an expected orientation of the WTRU 102, 200, 300 400 and 500 satisfies the orientation condition associated with the respective SRSp configuration; (9) a determined environmental state experienced by the WTRU 102, 200, 300 400 and 500 satisfies an environmental condition associated with the respective SRSp configuration; (10) an expected environmental state to be experienced by the WTRU 102, 200, 300 400 and 500 satisfies the environmental condition associated with the respective SRSp configuration; (11) a determined indoor/outdoor status of the WTRU 102, 200, 300 400 and 500 satisfies an indoor/outdoor condition associated with the respective SRSp configuration; and/or (12) an expected indoor/outdoor status of the WTRU 102, 200, 300 400 and 500 satisfies the indoor/outdoor status condition associated with the respective SRSp configuration.

FIG. 11 is a flow diagram illustrating a still further representative method implemented by a WTRU.

Referring to FIG. 11, the representative method 1100 may include, at block 1110, the WTRU 102, 200, 300 400 and 500 receiving configuration information associated with: (1) a first positioning operation, (2) a second positioning operation and (3) one or more trigger conditions for starting and/or stopping usage of the second positioning operation. At block 1120, the WTRU 102, 200, 300 400 and 500 may perform any of first PRS measurements and/or a first SRSp transmission with a network entity (NE) associated with a first cell using a first configuration associated with the first positioning operation. At block 1130, the WTRU 102, 200,

300 400 and 500 may, on condition that the one or more trigger conditions are satisfied to start using the second positioning operation: (1) initiate use of the second positioning operation, and (2) perform any of second PRS measurements and/or a second SRSp transmission using a second configuration associated with the second positioning operation.

In certain representative embodiments, the WTRU 102, 200, 300, 400 and 500 may, after initiating the second positioning operation, trigger the performance of the second PRS measurements using the second configuration associated with the second positioning operation during a mobility event (ME); synchronize the WTRU 102, 200, 300 400 and 500 with a second cell; and perform further PRS measurements using a further configuration after the synchronization of the WTRU 102, 200, 300 400 and 500 with the second cell. In certain embodiments, the performance of the first PRS measurements may use the first configuration before the ME is performed.

In certain representative embodiments, the WTRU 102, 200, 300, 400 and 500 may, after initiating the second positioning operation, trigger the performance of the second SRSp transmission using the second configuration associated with the second positioning operation during a mobility event (ME); synchronize the WTRU 102, 200, 300 400 and 500 with a first NE associated with a second cell; and perform further SRSp transmissions using a further configuration after the synchronizing of the WTRU with the second cell. In certain embodiments, the performance of the first SRSp transmission may use the first configuration before the ME is performed. For example, the second positioning operation may correspond to a relaxed or stricter synchronization timing requirement relative to the first positioning operation.

In certain representative embodiments, the first positioning operation may include any one of: (1) a downlink time difference of arrival operation; (2) an uplink SRSp operation; (3) a multi round-trip time (multi-RTT) operation and/or (4) a downlink PRS operation. The second positioning operation may include any different one of: (1) the downlink time difference of arrival operation; (2) the uplink SRSp operation; (3) the multi-RTT operation and/or (4) the downlink PRS operation.

In certain representative embodiments, the WTRU 102, 200, 300, 400 and 500 may send, to a Network Entity (NE), information indicating any of: (1) the second measurements; (2) timing information; (3) a timestamp indicating when the WTRU switched from using the first PRS configuration to the second PRS configuration; (4) a time difference between a received PRS and a transmitted SRSp; and/or (5) a measured RSRP for the PRS.

FIG. 12 is a flow diagram illustrating a still additional representative method implemented by a WTRU, e.g., to support positioning service continuity.

Referring to FIG. 12, the representative method 1200 may include, at block 1210, the WTRU 102, 200, 300 400 and 500 receiving configuration information indicating at least: (1) a plurality of PRS configurations including a first PRS configuration associated with a first cell or a first base station and a second PRS configuration associated with a second cell and (2) a first RAN configuration. At block 1220, the WTRU 102, 200, 300 400 and 500 may perform PRS measurements using the indicated first PRS configuration and the indicated first RAN configuration, on condition that the WTRU 102, 200, 300 400 and 500 is in a coverage area of the first cell or the first base station. At block 1230, the WTRU 102, 200, 300 400 and 500 may determine to initiate use of the second PRS configuration based on the PRS measurements. At block 1240, the WTRU 102, 200, 300 400 and 500 may determine, from the received configuration information, a second RAN configuration associated with the second PRS configuration. At block 1250, the WTRU 102, 200, 300 400 and 500 may initiate performance of PRS measurements using the second PRS configuration and the second RAN configuration.

In certain representative embodiments, the WTRU 102, 200, 300, 400 and 500 may any of: (1) send to a serving base station, as the first base station, information indicating the determined second RAN configuration; and/or (2) receive, from the serving base station, information confirming use or activation of the second RAN configuration.

In certain representative embodiments, the WTRU 102, 200, 300, 400 and 500 may trigger the performance of the PRS measurements in accordance with a mobility event (ME). For example, the performance of the PRS measurements may use the first PRS configuration and the first RAN configuration: (1) before the ME and/or (2) during at least a first part of the ME. In certain embodiments, the WTRU 102, 200, 300 400 and 500 may perform the PRS measurements using the second PRS configuration and the second RAN configuration (1) during at least a second part of the ME and/or (2) after the ME.

FIG. 13 is a flow diagram illustrating yet another representative method implemented by a WTRU, e.g., to support positioning service continuity.

Referring to FIG. 13, the representative method 1300 may include, at block 1310, the WTRU 102, 200, 300 400 and 500 receiving configuration information associated with: (1) a first positioning operation, (2) a second positioning operation and (3) one or more trigger conditions for starting and/or stopping usage of the second positioning operation. At block 1320, the WTRU 102, 200, 300 400 and 500 may perform any of PRS measurements and/or a SRSp transmission using a first PRS configuration associated with the first positioning operation. At block 1330, the WTRU 102, 200, 300 400 and 500 may, on condition that the trigger conditions are met to start using the second positioning operation: (1) initiate use of the second positioning operation, and/or (2) perform any of PRS measurements and/or a SRSp transmission using a second PRS configuration associated with the second positioning operation.

In certain representative embodiments, the WTRU 102, 200, 300, 400 and 500 may trigger the performance of the PRS measurements and/or a SRSp transmission using the second PRS configuration associated with the second positioning operation in accordance with a mobility event (ME). For example, the performance of the PRS measurements may use the first PRS configuration: (1) before the ME and/or (2) during at least a first part of the ME. As another example, the performance of the PRS measurements may use the second PRS configuration (1) during at least a second part of the ME and/or (2) after the ME.

FIG. 14 is a flow diagram illustrating a yet further representative method implemented by a WTRU, e.g., to support positioning service continuity.

Referring to FIG. 14, the representative method 1400 may include, at block 1410, the WTRU 102, 200, 300 400 and 500 receiving configuration information indicating: (1) one or more PRS configurations and (2) one or more area validity conditions. At block 1420, the WTRU 102, 200, 300 400 and 500 may, on condition that one or more cells having cell IDs indicated by the area validity conditions are detected, select a PRS configuration of the indicated PRS configurations that matches with at least one of the detected cells. At block 1430, the WTRU 102, 200, 300 400 and 500 may send, to a network entity, information indicating the cell ID of the at least one detected cell and the selected PRS configuration. At block 1440, the WTRU 102, 200, 300 400 and 500 may perform PRS measurements using the selected PRS configuration.

FIG. 15 is a flow diagram illustrating a yet additional representative method implemented by a WTRU.

Referring to FIG. 15, the representative method 1500 may include, at block 1510, the WTRU 102, 200, 300 400 and 500 receiving configuration information indicating at least: (1) first and second PRS configurations; (2) a first set of threshold values associated with the first PRS configuration and (3) a second set of threshold values associated with the second PRS configuration. At block 1520, the WTRU 102, 200, 300 400 and 500 may perform a hand over from a first base station to a second base station. For example, the indicated first PRS configuration associated with the first base station and the indicated first set of threshold values associated with the indicated first PRS configuration may be active during the hand over. At block 1530, the WTRU 102, 200, 300 400 and 500 may switch after the hand over from the active first PRS configuration associated with the first base station and the first set of threshold values associated with the indicated first PRS configuration to the indicated second PRS configuration associated with the second base station, as a new active PRS configuration, and the indicated second set of threshold values associated with the indicated second PRS configuration, as the new active set of threshold values.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, a UE, a terminal, a base station, a RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency trade-offs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art.

Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D, 2, and 3.

In certain embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero.

Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶16 or means-plus-function claim format, and any claim without the terms "means for" is not so intended.

Throughout the disclosure, one of skill understands that certain representative embodiments may be used in the alternative or in combination with other representative embodiments.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶16, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), a terminal, a base station, a Mobility Management Entity (MME) or an Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method implemented by a wireless transmit/receive unit (WTRU), the method comprising:

receiving information indicating: (1) a first Positioning Reference Signal (PRS) configuration associated with a first cell, (2) a second PRS configuration associated with a second cell, and (3) a measurement gap (MG) configuration;

performing first PRS measurements on a first transmission from the first cell using the first PRS configuration and the MG configuration;

sending, to a first Network Entity (NE) associated with the first cell, a request including information indicating to maintain, after a mobility event (ME) associated with the second cell is performed, the MG configuration; and receiving information indicating: (1) to perform the ME associated with the second cell, and (2) to maintain, after the ME is performed, the MG configuration.

2. The method of claim 1, comprising:

performing, after the ME is performed, second PRS measurements on the first transmission or a further transmission from the first cell using the first PRS configuration and the MG configuration.

3. The method of claim 2, comprising:

sending, to a second NE associated with the first cell, information indicating the second PRS measurements.

4. The method of claim 1, further comprising determining to send the request to the first cell indicating to maintain, after the ME is performed, the MG configuration.

5. The method of claim 3, wherein the first NE associated with the first cell and the second NE associated with the first cell are one base station or the first NE is a first base station and the second NE is a Location Management Function (LMF) entity.

6. The method of claim 2, wherein, on condition that the second PRS measurements do not satisfy a PRS ME threshold:

sending, to a first NE associated with the second cell, a request for a further MG configuration;

receiving, information indicating the further MG configuration;

performing third PRS measurements on a transmission from the second cell using the second PRS configuration and the further MG configuration; and sending, to a second NE associated with the second cell, further information indicating any of: (1) the third PRS measurements, (2) the second PRS configuration, and/ or (3) a time when the WTRU started to use the second PRS configuration.

7. The method of claim 6, wherein:

the first NE associated with the first cell and the second NE associated with the first cell are a single base station or the first NE associated with the first cell is a first base station and the second NE associated with the first cell is a Location Management Function (LMF) entity; and the first NE associated with the second cell and the second NE associated with the second cell are another single base station or the first NE associated with the second cell is a second base station and the second NE associated with the second cell is the Location Management Function (LMF) entity.

8. The method of claim 1, wherein:

the ME is any of: (1) a hand over; or (2) a reselection; and the method includes performing the handover or the reselection of the WTRU to the second cell.

9. The method of claim 6, wherein:

the further information is included in a positioning service continuity report; and the method includes receiving a new PRS configuration or an updated PRS configuration in response to the positioning service continuity report, wherein the new PRS configuration or the updated PRS configuration is associated with a target NE or the first NE associated with the second cell.

10. The method of claim 2, wherein the performing of second PRS measurements on the first transmission or the further transmission from the first cell, after the ME is performed, using the first PRS configuration and the MG configuration includes performing of the first PRS measurements on the first transmission from the first cell using the first PRS configuration associated with the first cell after a data link handover in a coverage area of the second cell.

11. The method of claim 1, further comprising performing, before the ME is performed, further PRS measurements on a transmission from the second cell using the second PRS configuration associated with the second cell in a coverage area of the first cell.

12. The method of claim 1, further comprising performing, during the ME, further PRS measurements: (1) on the transmission from the first cell using the first PRS configuration of the first cell and (2) on a transmission from the second cell using the second PRS configuration associated with the second cell.

13. The method of claim 1, further comprising switching, during the ME, from a first positioning method to a second positioning method.

14. The method of claim 1, further comprising receiving, by the WTRU, information indicating to use, activate or deactivate one or more of the PRS configurations.

15. The method of claim 2, further comprising:

triggering the performing of the second PRS measurements in response to the ME, wherein:

the performing of: (1) the first PRS measurements uses the first PRS configuration and the MG configuration before the ME is performed and (2) the second PRS measurements uses the first PRS configuration and the MG configuration during at least a first part of the ME, the method includes performing further PRS measurements using the second PRS configuration and the MG configuration (1) during at least a second part of the ME and (2) after the ME is performed.

16. The method of claim 2, comprising:

receiving, by the WTRU, information associated with: (1) a first positioning operation, (2) a second positioning operation and (3) one or more trigger conditions for starting and/or stopping usage of the second positioning operation; and on condition that the one or more trigger conditions are satisfied to start using the second positioning operation, initiating use of the second positioning operation, wherein:

the performing of the first PRS measurements uses the first PRS configuration associated with the first positioning operation, and the performing of the second PRS measurements uses the second PRS configuration associated with the second positioning operation.

17. The method of claim 16, further comprising:

triggering the performing of the second PRS measurements using the second PRS configuration associated with the second positioning operation in response to the ME, wherein:

the performing of the first PRS measurements uses the first PRS configuration: (1) before the ME is performed and (2) during at least a first part of the ME, the performing of the second PRS measurements uses the second PRS configuration (1) during at least a second part of the ME and (2) after the ME is performed.

18. The method of claim 1, further comprising:

receiving, by the WTRU, reporting configuration information indicating a plurality of reporting configurations, wherein each indicated reporting configuration is associated with a type of trigger condition associated with the ME; and sending, to a Location Management Function (LMF) Entity, a positioning report in accordance with the type of trigger condition associated with the ME.

19. The method of claim 18, wherein the type of trigger condition associated with the ME includes any of: (1) a speed-related trigger condition associated with the WTRU; (2) a velocity-related trigger condition associated with the WTRU; (3) a direction of movement-related trigger condition associated with the WTRU; (4) an orientation-related trigger condition associated with the WTRU; (5) an environment-related trigger condition associated with the WTRU; (6) an indoor/outdoor status-related trigger condition associated with the WTRU; and/or (7) a neighbouring cell detection/discover-related trigger condition.

20. The method of claim 18, wherein a first reporting configuration of the indicated plurality of reporting configurations includes first periodicity information and a second reporting configuration of the indicated plurality of reporting configurations includes second, different periodicity information.

21. A wireless transmit/receive unit (WTRU) comprising circuitry including any of a processor, a transceiver and memory, the circuitry configured to:

receive information indicating: (1) a first Positioning Reference Signal (PRS) configuration associated with a first cell, (2) a second PRS configuration associated with a second cell, and (3) a measurement gap (MG) configuration;

perform first PRS measurements on a first transmission from the first cell using the first PRS configuration and the MG configuration;

send, to a first Network Entity (NE) associated with the first cell, a request including information indicating to maintain, after a mobility event (ME) associated with the second cell is performed, the MG configuration; and receive information indicating: (1) to perform the ME associated with the second cell, and (2) to maintain, after the ME is performed, the MG configuration.

22. The WTRU of claim 21, wherein the circuitry is configured to:

perform, after the ME is performed, second PRS measurements on the first transmission or a further transmission from the first cell using the first PRS configuration and the MG configuration.

23. The WTRU of claim 22, wherein the circuitry is configured to:

send, to a second NE associated with the first cell, information indicating the second PRS measurements.

24. The WTRU of claim 21, wherein the circuitry is configured to determine to send the request to the first cell indicating to maintain, after the ME is performed, the MG configuration.

25. The WTRU of claim 23, wherein the first NE associated with the first cell and the second NE associated with the first cell are one base station or the first NE is a first base station and the second NE is a Location Management Function (LMF) entity.

26. The WTRU of claim 22, wherein, on condition that the second PRS measurements do not satisfy a PRS ME threshold, the circuitry is configured to:

send, to a first NE associated with the second cell, a request for a further MG configuration;

receive, information indicating the further MG configuration;

perform third PRS measurements on a transmission from the second cell using the second PRS configuration and the further MG configuration; and send, to a second NE associated with the second cell, further information indicating any of: (1) the third PRS measurements, (2) the second PRS configuration, and/or (3) a time when the WTRU started to use the second PRS configuration.

27. The WTRU of claim 26, wherein:

the first NE associated with the first cell and the second NE associated with the first cell are a single base station or the first NE associated with the first cell is a first base station and the second NE associated with the first cell is a Location Management Function (LMF) entity; and the first NE associated with the second cell and the second NE associated with the second cell are another single base station or the first NE associated with the second cell is a second base station and the second NE associated with the second cell is the Location Management Function (LMF) entity.

28. The WTRU of claim 21, wherein:

the ME is any of: (1) a hand over; or (2) a reselection; and the circuitry is configured to perform the handover or the reselection of the WTRU to the second cell.

29. The WTRU of claim 26, wherein:

the further information is included in a positioning service continuity report; and the circuitry is configured to receive a new PRS configuration or an updated PRS configuration in response to the positioning service continuity report, wherein the new PRS configuration or the updated PRS configuration is associated with a target NE or the first NE associated with the second cell.

30. The WTRU of claim 22, wherein the performing of second PRS measurements on the first transmission or the further transmission from the first cell, after the ME is performed, using the first PRS configuration and the MG configuration includes performing of the first PRS measurements on the first transmission from the first cell using the first PRS configuration associated with the first cell after a data link handover in a coverage area of the second cell.

31. The WTRU of claim 21, wherein the circuitry is configured to perform, before the ME is performed, further PRS measurements on a transmission from the second cell using the second PRS configuration associated with the second cell in a coverage area of the first cell.

32. The WTRU of claim 21, wherein the circuitry is configured to perform, during the ME, further PRS measurements: (1) on the transmission from the first cell using the first PRS configuration of the first cell and (2) on a transmission from the second cell using the second PRS configuration associated with the second cell.

33. The WTRU of claim 21, wherein the circuitry is configured to switch, during the ME, from a first positioning method to a second positioning method.

34. The WTRU of claim 21, wherein the circuitry is configured to receive information indicating to use, activate or deactivate one or more of the PRS configurations.

35. The WTRU of claim 22, wherein the circuitry is configured to:

trigger the performing of the second PRS measurements in response to the ME, wherein the performing of: (1) the first PRS measurements uses the first PRS configuration and the MG configuration before the ME is performed and (2) the second PRS measurements uses the first PRS configuration and the MG configuration during at least a first part of the ME; and perform further PRS measurements using the second PRS configuration and the MG configuration (1) during at least a second part of the ME and (2) after the ME is performed.

36. The WTRU of claim 22, wherein the circuitry is configured to:

receive information associated with: (1) a first positioning operation, (2) a second positioning operation and (3) one or more trigger conditions for starting and/or stopping usage of the second positioning operation; and on condition that the one or more trigger conditions are satisfied to start using the second positioning operation, initiate use of the second positioning operation, wherein:

the performing of the first PRS measurements uses the first PRS configuration associated with the first positioning operation, and the performing of the second PRS measurements uses the second PRS configuration associated with the second positioning operation.

37. The WTRU of claim 36, wherein the circuitry is configured to:

trigger the performing of the second PRS measurements using the second PRS configuration associated with the second positioning operation in response to the ME, wherein:

the performing of the first PRS measurements uses the first PRS configuration: (1) before the ME is performed and (2) during at least a first part of the ME, the performing of the second PRS measurements uses the second PRS configuration (1) during at least a second part of the ME and (2) after the ME is performed.

38. The WTRU of claim 21, wherein the circuitry is configured to:

receive, by the WTRU, reporting configuration information indicating a plurality of reporting configurations, wherein each indicated reporting configuration is associated with a type of trigger condition associated with the ME; and send, to a Location Management Function (LMF) Entity, a positioning report in accordance with the type of trigger condition associated with the ME.

39. The WTRU of claim 38, wherein the type of trigger condition associated with the ME includes any of: (1) a speed-related trigger condition associated with the WTRU; (2) a velocity-related trigger condition associated with the WTRU; (3) a direction of movement-related trigger condition associated with the WTRU; (4) an orientation-related trigger condition associated with the WTRU; (5) an environment-related trigger condition associated with the WTRU; (6) an indoor/outdoor status-related trigger condition associated with the WTRU; and/or (7) a neighbouring cell detection/discover-related trigger condition.

40. The WTRU of claim 38, wherein a first reporting configuration of the indicated plurality of reporting configurations includes first periodicity information and a second reporting configuration of the indicated plurality of reporting configurations includes second, different periodicity information.

* * * * *